United States Patent
Garber

(10) Patent No.: US 11,603,295 B2
(45) Date of Patent: Mar. 14, 2023

(54) SUSPENDED AUTONOMOUS CARRIER FOR END-EFFECTOR DEVICE

(71) Applicant: MRB AutoLab LLC, Ann Arbor, MI (US)

(72) Inventor: James B. Garber, Ann Arbor, MI (US)

(73) Assignee: MRB AutoLab LLC, Ann Arbor, MI (US)

(*) Notice: Subject to any disclaimer, the term of this patent is extended or adjusted under 35 U.S.C. 154(b) by 563 days.

(21) Appl. No.: 16/633,192

(22) PCT Filed: Jul. 26, 2018

(86) PCT No.: PCT/US2018/043878
§ 371 (c)(1),
(2) Date: Jan. 23, 2020

(87) PCT Pub. No.: WO2019/023442
PCT Pub. Date: Jan. 31, 2019

(65) Prior Publication Data
US 2021/0155459 A1    May 27, 2021

Related U.S. Application Data

(60) Provisional application No. 62/537,166, filed on Jul. 26, 2017.

(51) Int. Cl.
*B66C 21/00* (2006.01)
*B66D 1/38* (2006.01)

(52) U.S. Cl.
CPC .............. *B66C 21/00* (2013.01); *B66D 1/38* (2013.01)

(58) Field of Classification Search
CPC ...... B66C 21/00; B66C 21/02–10; B66D 1/38
See application file for complete search history.

(56) References Cited

U.S. PATENT DOCUMENTS

| 4,337,553 A | 7/1982 | Fischer |
| 4,710,819 A | 12/1987 | Brown |

(Continued)

FOREIGN PATENT DOCUMENTS

| CN | 202471688 U | 10/2012 |
| CN | 104374891 A | 2/2015 |

(Continued)

OTHER PUBLICATIONS

Graves, George, "3D Cable Robot Uses the Building as Its Exoskeleton", http://hackaday.com/2015/09/21/3d-cable-robot-uses-the-building-as-its-exoskeleton/.

(Continued)

*Primary Examiner* — Sang K Kim
*Assistant Examiner* — Nathaniel L Adams
(74) *Attorney, Agent, or Firm* — Endurance Law Group PLC

(57) ABSTRACT

In a cable-driven three-dimensional crane system, an end-effector is moved within an operating volume defined by dynamically shifting draw points. Winch assemblies pull the end-effector toward the respective draw points. Each winch assembly includes a cable router that manages travel of its drive cable through the associated draw point. Cable length encoders determine the effective length of each drive cable, from which one method of end-effector position calculations can be made. Draw point angle trackers assess the instantaneous lateral and vertical angles of each drive cable as it vectors away from its draw point toward the carrier from which another method of end-effector position calculations can be made as well as enabling self-calibration techniques. Sensitive mechanical and electrical components are sheltered in heated enclosures that wipe debris from the drive cable and track with its changing position. Multi-zone applications allow sharing of winch assemblies.

20 Claims, 13 Drawing Sheets

(56) References Cited

U.S. PATENT DOCUMENTS

| | | |
|---|---|---|
| 5,263,376 A | 11/1993 | Sun |
| 5,408,407 A | 4/1995 | Lefkowitz et al. |
| 5,440,476 A | 8/1995 | Lefkowitz et al. |
| 5,585,707 A | 12/1996 | Thompson et al. |
| 5,734,111 A | 3/1998 | Soo |
| 5,869,756 A | 2/1999 | Doherty et al. |
| 6,429,778 B1 | 8/2002 | Chuang |
| 6,809,495 B2 | 10/2004 | Rodnunsky |
| 7,036,436 B2 | 5/2006 | MacDonald et al. |
| 7,040,157 B2 | 5/2006 | Glasgow et al. |
| 7,062,962 B2 | 6/2006 | Pastemack et al. |
| 7,118,094 B2 | 10/2006 | McDaniel et al. |
| 8,199,197 B2 | 6/2012 | Bennett et al. |
| 9,063,390 B2 * | 6/2015 | Wharton ................. B66C 21/00 |
| 9,457,473 B2 * | 10/2016 | Rudakevych .......... B25J 9/1697 |
| 10,016,891 B2 * | 7/2018 | Reid ........................ B25J 9/126 |
| 10,103,813 B2 * | 10/2018 | Wharton ................ H04B 10/25 |
| 2003/0136443 A1 | 7/2003 | Wain et al. |
| 2003/0168647 A1 | 9/2003 | Thompson et al. |
| 2008/0072443 A1 | 3/2008 | Powell |
| 2009/0207250 A1 | 8/2009 | Bennett et al. |
| 2012/0118208 A1 | 5/2012 | Kim et al. |

FOREIGN PATENT DOCUMENTS

| | | |
|---|---|---|
| CN | 105137021 A | 12/2015 |
| DE | 3013364 A1 | 10/1980 |
| DE | 102004021809 A1 | 12/2005 |
| JP | S60233562 | 11/1985 |

OTHER PUBLICATIONS

NFL Skycam, https://en.wikipedia.org/wiki/Skycam.

* cited by examiner

SUSPENDED AUTONOMOUS CARRIER FOR END-EFFECTOR DEVICE

CROSS REFERENCE TO RELATED APPLICATIONS

This application claims priority to Provisional Patent Application U.S. Ser. No. 62/537,166 filed on Jul. 26, 2017, the entire disclosure of which is hereby incorporated by reference and relied upon.

BACKGROUND OF THE INVENTION

Field of the Invention

The invention relates generally to a cable-driven robot for conveying equipment such as sensors, sample collection devices and chemical feed equipment, in a 3-dimensional operating volume, and more particularly to a cable-driven robot adapted for use in submerged applications such as waste water treatment tanks.

Description of Related Art

Cable driven robots are a type of parallel manipulator in which flexible drive cables are used as actuators. One end of each drive cable is reeled around a spool reversibly driven by a motor, and the other end is connected to an end-effector. Drive cables in a cable robot system can only pull an object; they cannot push. Cables are much lighter than rigid linkages of a serial or parallel robot, and very long drive cables can be used without making the mechanism massive. As a result, the end-effector of a cable robot can be used to traverse very large operating volumes.

Despite their versatility, the environmental engineering field has not seen significant use of cable robots. The limited examples of cable robot systems used for environmental monitoring applications include U.S. Pat. Nos. 5,263,376, 5,869,756, 6,429,778, 7,040,157, CN104374891, CN105137021, and DE102004021809. All of these prior art systems utilize a single drive cable and can therefore move only in one dimension.

The systems designed for 3-dimensional movement of an end-effector include U.S. Pat. Nos. 4,710,819, 7,036,436, 8,199,197 and 9,063,390. While these examples appear to be primarily intended for videography applications, at least some seem to suggest that the end-effector could be a sensor instead of a camera. None of these systems are well-suited to use in the field of environmental engineering because they are designed for high speed and controlled acceleration rather than accuracy and precision. The known systems also lack position feedback to verify end-effector position that was achieved by mere calculation of the effective lengths of each drive cable. (A method known to be susceptible to increasing error over time as cables stretch and components wear.) Further, the known systems do not include protection from the elements that would normally be required for most environmental applications.

There is a significant need in the environmental engineering and scientific community for a simple, cost effective, cable robot with high accuracy and precision capable of use over very large operating volumes. Known 3-D cable robot systems control the movement of the end-effector by changing respective drive cable lengths. The length of each drive cable is considered to be the difference between a draw point at or near the last pulley, and the end-effector. This draw point is typically approximated as a static point at the center or perimeter of the last pulley and is treated as a constant in movement calculations. However, as a given drive cable is moved, the point at which it separates from the last pulley can change, and that point of separation moves in an arc as the pulley and its corresponding bracket pivot. Known 3-D cable robot systems use a single pulley at each corner and treat the draw point coordinates as constant, even though the coordinates of these draw points change continuously as the end-effector moves throughout the operating volume. Further, using single pulleys at each corner, the corner points move in a way that is not easy to describe mathematically, because the pulleys are not aligned with the Cartesian coordinate system for the operating volume. It would be desirable to have an apparatus and method for dynamic calculation of corner point coordinates, to improve the accuracy and precision of end-effector positioning. It would further be desirable to have a pulley assembly configuration that facilitates calculation of draw point coordinates in the selected Cartesian coordinate system.

Position feedback is needed to verify that the system is operating with the necessary accuracy and precision and to trigger needed calibration, especially during unattended operation. Prior art 3-D cable robot systems do not easily accommodate end-effector position feedback. There are a few examples of angle measurement for calculation/estimation of end-effector position in related systems, such as may be found in U.S. Pat. Nos. 4,500,749 and 7,395,609. Of these examples, the first is considered to be more accurate, since the draw point does not change (i.e., a fairlead is essentially a constant point). The example described in U.S. Pat. No. 7,395,609 is considered to be less accurate, since the shifting movement of the draw point is not addressed.

There is therefore a need in the art for an apparatus and method for calculating the end-effector position of a cable robot with improved accuracy in an economical manner and well-suited to use in the environmental engineering and scientific communities.

BRIEF SUMMARY OF THE INVENTION

According to one aspect of the present invention, a cable-driven three-dimensional crane system is provided for accurately positioning an autonomous carrier within an operating volume defined between a plurality of dynamically shifting draw points. The system comprises a carrier configured to autonomously move an end-effector device within the operating volume. Multiple winch assemblies are spaced apart from one another in the system. Each winch assembly is associated with a respective one of the draw points, and comprises a windlass and a drive cable and a cable router. The windlass includes a spool driven by a reversible motor that turns the spool in either a clockwise or counterclockwise direction. The drive cable has a proximal end and a distal end. The proximal end is operatively wound around the spool of the associated windlass, and the distal end is directly connected to the carrier. Within each winch assembly, the cable router is operatively disposed along its associated drive cable between the windlass and the carrier. The cable router is configured to constrain a running portion of the associated drive cable as it transits the associated draw point with smooth changes in the direction of and the transmission of force through the drive cable due to positional changes of the carrier within the operating volume. Each winch assembly includes a cable length encoder operatively engaging the associated drive cable for assessing the changes in its effective length. And each winch assembly includes a draw point angle tracker operatively disposed with respect to the cable router to assess the instantaneous lateral and vertical angles of the drive cable vectoring from its draw point toward the carrier.

The present invention enables a relatively simple, cost effective, cable robot with high accuracy and precision capable of use over very large operating volumes that is suited for use in the environmental engineering and scientific communities. The system of this invention enables energy saving modifications to facilities of all types, including but not limited to wastewater plants, than are currently not economically feasible, such as zone control of aeration in activated sludge systems to name but one. This invention also enables process monitoring and optimization in a wide variety of systems, using 3-D monitoring and sampling for various operating parameters, including but not limited to dissolved oxygen (DO), chemical oxygen demand (COD), total suspended solids (TSS), nutrients, mixing intensity, etc.

These and other advantages are achieved through the artful use of a draw point angle tracker that supplies angle data to calculate dynamically-shifting draw point positions. By ascertaining the real-time position of the dynamic draw points, a relatively accurate and precise position of the end-effector can be determined. An added benefit of accurate position data is that the system is better suited to monitor for one or more parameters and also modify the environment in response to those results (such as localized pH adjustment, etc.).

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Referring to the figures, wherein like numerals indicate like or corresponding parts throughout the several views, a cable-driven three-dimensional crane system for accurately positioning an autonomous carrier within an operating volume defined between a plurality of dynamically shifting draw points A is generally shown at 20. The system 20 of this invention may be described as a cable-driven robot for conveying equipment such as sensors, sample collection devices and chemical feed equipment, in a predictable 3-dimensional operating volume 22. The general form of the system 20 may be thought of as a simple point-mass type cable robot, with enhancements to improve accuracy and precision. This invention can be implemented in both fully-constrained and over-constrained cable robot system configurations.

In one application context for this invention, the operating volume 22 is a large holding tank of the type used in connection with waste water treatment applications. Thus, the operating volume 22 may take the form of large tank-like structure used to contain a volume of liquids for treatment purposes. This is offered merely as an example; the scope of this invention is not limited to the context of water/liquid treatment facilities. Other exemplary applications might include liquid chemical processing, booths for painting or cleaning, robotic fabrication, material handling, gaseous chemical processing, videography for inspection applications or over a defined area, and the like. The substance contained within the operating volume 22 may not always be in a fluid state. For example, in some filtration applications, the operating volume 22 encompasses a filter bed that is only fluidized in backwash mode. Rather than a tank, the operating volume 22 may also take the form of a section of pipe or channel or conduit through which a transitory volume of fluid flows or is only temporarily stationed therein.

Figure 1:
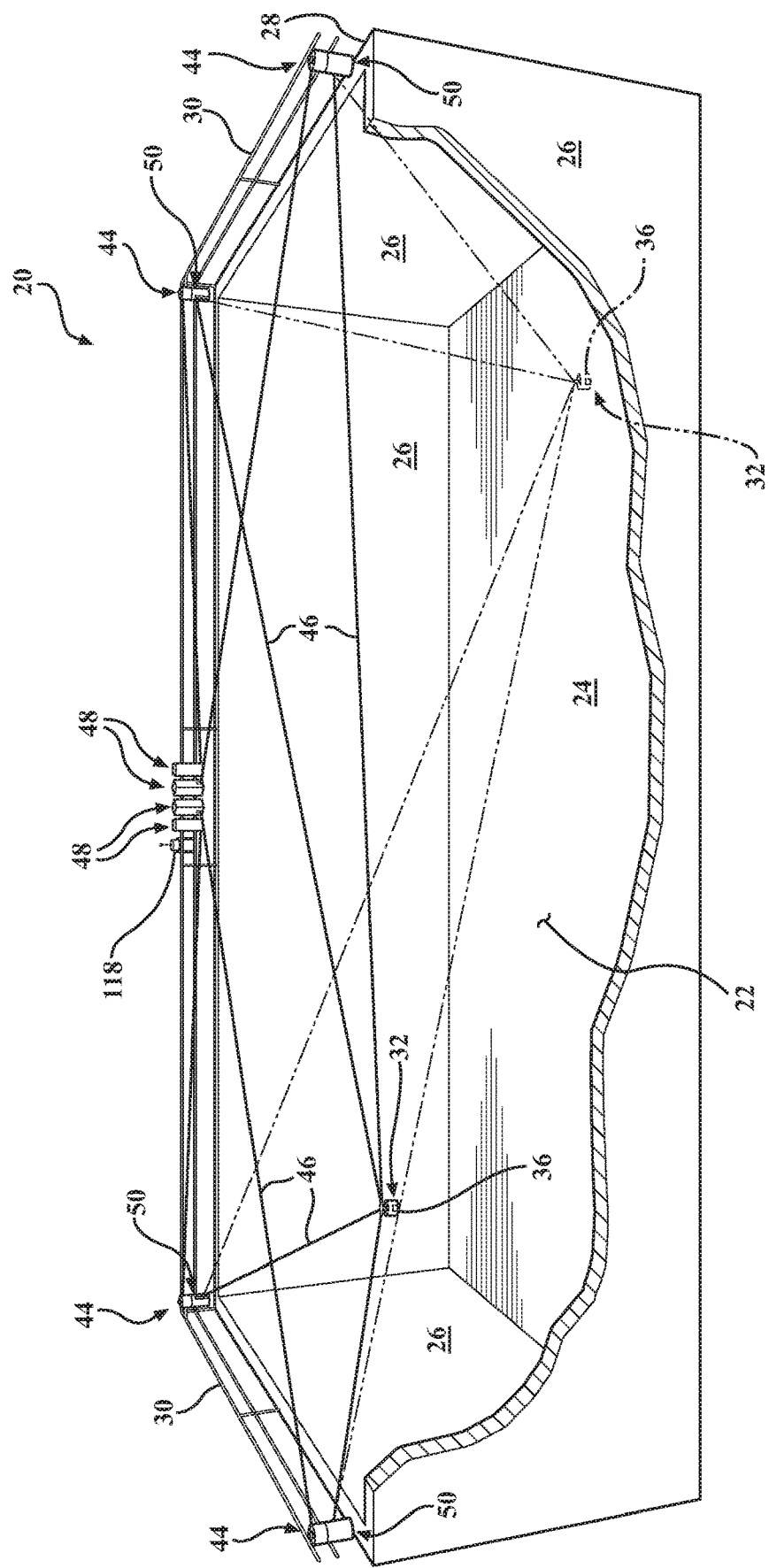
FIG. 1 is an environmental perspective view of a large tank fitted with the system of this invention to accurately position a suspended autonomous carrier within an operating volume defined therein, with a front wall of the tank partially hidden to show movement of the carrier to a different position in phantom.

In the exemplary tank context, the operating volume 22 has a floor 24 surrounded by at least one upstanding sidewall 26, and either an open or covered top. When configured as a flow-through channel, the operating volume 22 will have the equivalent of a floor 24 and opposing sidewalls 26 open at either end. In the water/liquid treatment context, the operating volume 22 may be exposed to local environmental conditions including extreme heat and cold and other weather events directly affecting the components of this invention and their functionality. In the example of FIG. 1, the operating volume 22 is bounded above the floor 24 by four orthogonal sidewalls 26. Water (or other treatment liquid) may fill most or all of the operating volume 22. Those of skill in the art can envision an operating volume 22 with as little as one sidewall 26 (in the case of a circular configuration) or many more than four (in the case of an irregular polygonal configuration). In the example of FIG. 1, the sidewall 26 has an upper edge 28. In the water/liquid treatment context, the upper edge 28 may be wide enough to allow human foot traffic for purposes of inspection and maintenance. A guard rail 30 and/or security fence (not shown) may be affixed to or near the upper edge 28.

For purposes that will become apparent, a plurality (preferably at least three) locations for draw points A will be designated at the time of installation. The locations for the draw points A are distributed about the sidewalls 26. Although the actual draw points A are spatially dynamic (i.e, they shift position in use), their range of motion is fairly limited such that their locations can be generally aligned with natural features of the operating volume 22, such as corners, or arbitrarily located as may be necessary or expedient, e.g., in circular sidewall 26 configurations. In typical cases, it is convenient to align the locations of the draw points A with corresponding corner features where two sidewalls 26 meet. Generally stated, the defined region of the operating volume 22 is in the midst of the draw points A, above the floor 24 (or other suitable boundary feature). And to be clear, the draw points A are not physical features, but rather shifting (i.e., dynamic) points in space.

A carrier, generally indicated at 32, is disposed for precise, autonomous movement within the operating volume 22. By strategically pulling the carrier 32 toward the draw points A with varying forces, the carrier 32 can be made to travel anywhere within the operating volume 22. The carrier 32 has a universal mounting platform 34 configured to attach an end-effector 36 device. A representative depiction of an end-effector 36 is shown in phantom in FIG. 13. The end-effector 36 can be almost any type of scientific device (or combination of devices) capable of sampling, dispensing, changing, disturbing/agitating, measuring, sensing and/or imaging (etc.) the matter or space around it. Travel limits of the carrier 32 correspond to the boundaries of the operating volume 22 as defined by the draw points A. Thus, the operating volume 22 includes any location that is accessible to the carrier 32.

By moving the end-effector 36 to different positions within the operating volume 22, differing effects can be performed on the immediate surrounding matter/space. The end-effector 36 may be used to carry one or more sensors, and/or a variety of other equipment. In one embodiment, the end-effector 36 is used to carry equipment to both monitor ambient parameter(s) and respond based on the observations (i.e., zone pH control, dead zone mixing, etc.). Thus, the end-effector 36 can first assess certain qualities in the matter or space at a given location, and then perform operations to effect change in those qualities if needed before proceeding to a new location within the operating volume 22. In this manner, the entire operating volume 22 can be methodically interrogated and/or treated with computer-controlled precision via the end-effector 36.

Figure 13:
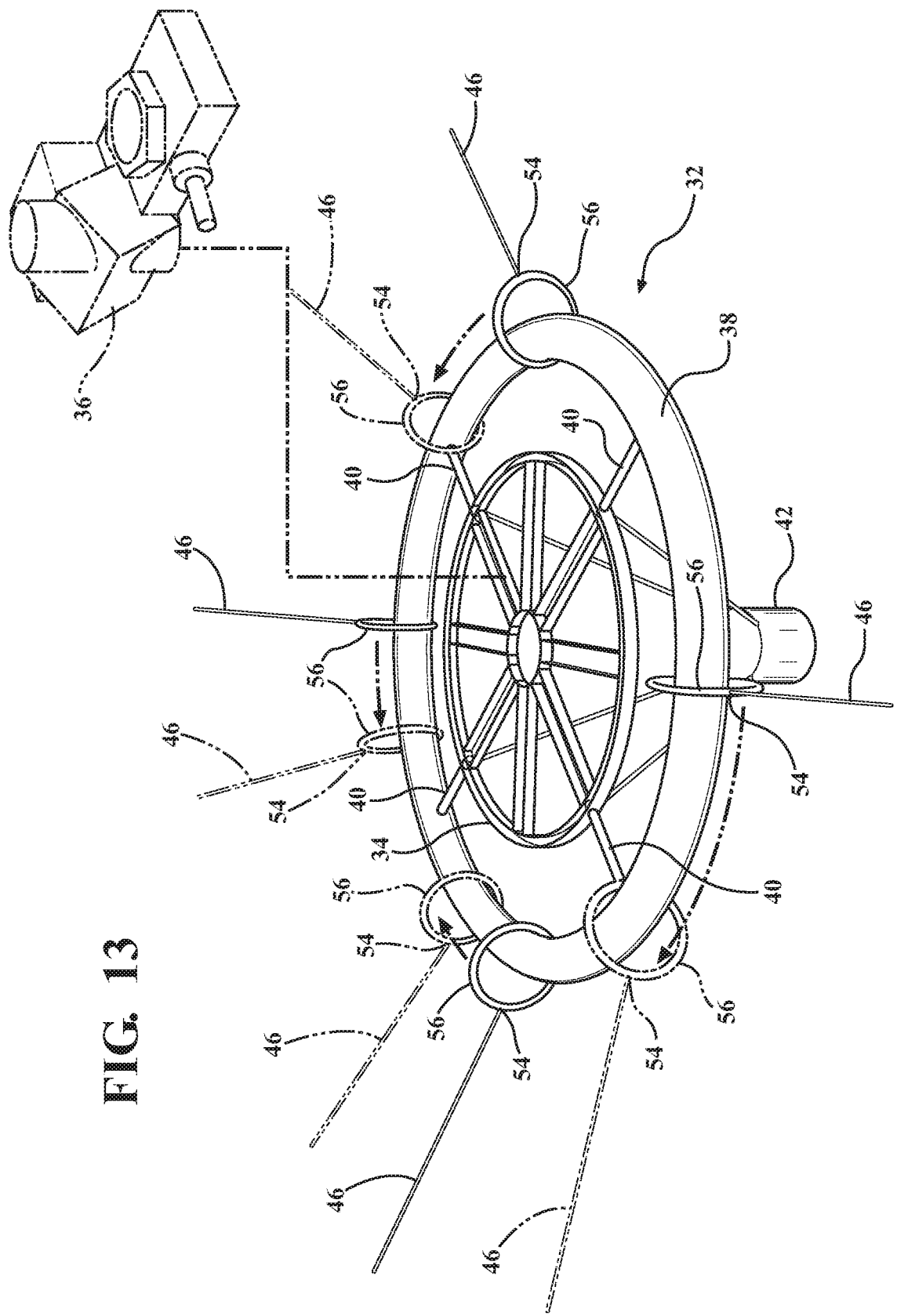
FIG. 13 is a perspective view of a carrier and end-effector according to one exemplary embodiment of the invention.

FIG. 13 shows in some detail one exemplary depiction of a carrier 32 in which the universal mounting platform 34 is composed of a series of mounting rails arranged in the circular shape of a wagon-wheel. Naturally, the universal mounting platform 34 could be just about any shape, so long as it can accommodate attachment of the desired end-effector 36. One of skill in the art can imagine a scenario in which the carrier 32 is integrated with a dedicated end-effector 36 device such that the two members are essentially combined into one unit.

The carrier 32 could be configured in a wide variety of ways, including after the well-known principles of a simple point-mass cable robot where the distal ends of all cables attach to a common single point, typically directly above the center-of-mass of the end-effector 36. Typically, in these cases, the end-effector 36 will be modeled as a lumped mass located at the point of intersection of the cables.

In the FIG. 13 embodiment, the carrier 32 is depicted in a novel configuration having a ring 38 positioned substantially level with the platform 34 for suspension of the carrier 32. In another contemplated embodiment, not shown, the ring 38 is positioned above platform 34 for a more pronounced suspension of the carrier 32. Regardless of its shape, the universal mounting platform 34 can be shown to have a geometric center which in the example of FIG. 13 would be located at the hub of the wagon-wheel like shape. The ring 38, being generally circular, is thus concentrically oriented with respect to the geometric center of the universal mounting platform 34. One or more spokes 40 extend across the ring 38. In some cases, the number of spokes 40 may correspond to the number of designated draw points A in the operating volume 22. Thus, if the operating volume 22 has four draw points A (as in FIG. 1), then the carrier 32 might have four spokes 40, and so forth. The ring 38 will typically be small enough in diameter that the carrier 32 will behave as a point mass as it is moved throughout the operating volume 22. The carrier 32 may also include a stabilizer weight 42 suspended below the universal mounting platform 34 or located directly on mounting platform 34, to counter the weight of a device on the carrier 32. The stabilizer weight 42 is vertically centered below the geometric center of the universal mounting platform 34, and helps the carrier 32 maintain a level disposition while moving to different locations within the operating volume 22 and provides stability in turbulent conditions. Naturally, the configuration of the carrier 32 in FIG. 13 is just an example; many variations are possible.

The system 20 further includes a plurality of winch assemblies, generally shown at 44. One winch assembly 44 corresponds to each draw point A of the operating volume 22. If the operating volume 22 has four draw points A (as in FIG. 1), then the system 20 will have four winch assemblies 44. An operating volume 22 with three draw points A will have three winch assemblies 44. Six draw points A requires six winch assemblies 44, and so forth.

The purpose of each winch assembly 44 is to pull the carrier 32 toward its respective draw point A. With carefully controlled and coordinated efforts, each winch assembly 44 can be made to draw the carrier 32 toward, or allow the carrier 32 to be drawn away from, its respective draw point A. A concerted blend of tensile forces exerted by and among the several winch assemblies 44 is thus effective to move the carrier 32 to any position within the operating volume 22. Preferably, for gravity systems all of the draw points A are located at the upper limit of the operating volume 22. However, in some contemplated "buoyancy" embodiments the draw points A may be located at the lower limit of the operating volume 22.

Each winch assembly 44 comprises, at least, a drive cable 46 and a windlass 48 and a cable router 50. The example of FIG. 1 shows four winch assemblies 44 strategically located around the operating volume 22. Although the reference arrow 44 is shown pointing to respective corners of the operating volume 22, it will be understood that the several sub-components of each winch assembly 44 (i.e., the drive cable 46, windlass 48 and cable router 50) may be distributed to places remote from the indicated corners. As will be described, the windlasses 48 of each winch assembly 44 are ganged near each other on a rear sidewall 26, whereas the respective cable routers 50 are located at the respective corners.

The drive cable 46 may be any suitable cord or rope or filament or chain or other flexible motion transmitting element configured for tensile (pull) loading along its length. Preferably, the drive cable 46 is reasonably resistant to stretch and is chemically resistant within the intended environment. For example, a drive cable 46 exposed to water and normal environmental weather effects will be at least corrosion and UV resistant.

The drive cable 46 has a proximal end attached to the spool 52 (FIG. 4) of its associated windlass 48, and an opposite free or distal end 54. The proximal end of the drive cable 46 is attached to and wound around the spool 52. The distal end 54 of the drive cable 46 is directly connected to the carrier 32 for suspending the carrier 32 within the operating volume 22. In the embodiment of FIG. 13, the distal end 54 of the drive cable 46 is fitted with a slip ring 56 that is operatively disposed about the ring 38 of the carrier 32. In this manner, the distal end 54 of each drive cable 46 has some ability to shift its connection point with respect to the carrier 32 but at all times the distance from the distal end to the geometric center of the universal mounting platform 34 remains constant. That is to say, if for example the inner diameter of the ring 38 is sixteen inches (16"), then the horizontal distance from each distal end 54 to the geometric center of the universal mounting platform 34 is always eight inches (8") regardless of the location of the carrier 32 within the operating volume 22 (assuming the carrier 32 remains generally horizontal). FIG. 13 shows in phantom the slip rings 56 shifted to different positions along the ring 38. The fragmentary portions of drive cable 46 emanating from each slip ring 56 point like vectors toward the respective draw points A.

The windlass 48 of this invention can take many different forms and configurations. In all such contemplated configurations, the windlass 48 is expected to include a spool 52 upon which the proximal end of the drive cable 46 is wound. A reversible motor 58 is operatively coupled to the spool 52 to cause the distal end 54 of the drive cable 46 to be pulled in or played out as the spool 52 turns in either a clockwise or counterclockwise direction (i.e., capable of bi-directional operation). The spool 52 may be attached directly to the output shaft of the motor 58, or indirectly thought a gear train, belt drive, or other form of transmission. The motor 58 may be of the gear motor or stepper motor type. The motor 58 is preferably electrically powered but could alternatively be pneumatic or hydraulic or perhaps other.

The windlass 48 may optionally include a motor enclosure 60, as shown in FIGS. 1-4. A motor enclosure 60 is used, as needed, to protect sensitive elements from wind, ice, etc., for the purpose of improving system accuracy, precision, and reliability. The motor enclosure 60 provides a clean dry shelter for the spool 52 and motor 58 and any other associated components. The motor enclosure 60 may be formed from any material suitable for the intended operating environment, including solid or flexible options. In outdoor environments susceptible to freezing temperatures, the motor enclosure 60 may be thermally-insulated and fitted with automated thermostat 62 and heater 64 to maintain internal temperature high enough so that ice cannot form inside. A drain hole 65 may be included to help evacuate accumulated moisture in the motor enclosure 60.

Provision is made for the drive cable 46 to pass through the motor enclosure 60 by way of a motor wiper port 66. The motor wiper port 66 may be a simple hole or slot in the motor enclosure 60, or instead may be configured to scrape debris from the drive cable 46 as it transits therethrough. In waste water treatment applications, for example, the portion of drive cable 46 drawn into the motor enclosure 60 could conceivably be wetted and possibly carry debris. Cleaning this clinging water and debris is needed to reduce the accumulation of unwanted water and debris inside the motor enclosure 60, an issue that becomes more vital in freezing conditions. A wide variety of designs and mechanisms may be available to provide the desired low-friction wiping action and retain heat. In one simple exemplary embodiment, the motor wiper port 66 is fitted with brushes and arranged so that the drive cable 46 passes between the opposing tips of the bristles.

Figure 4:
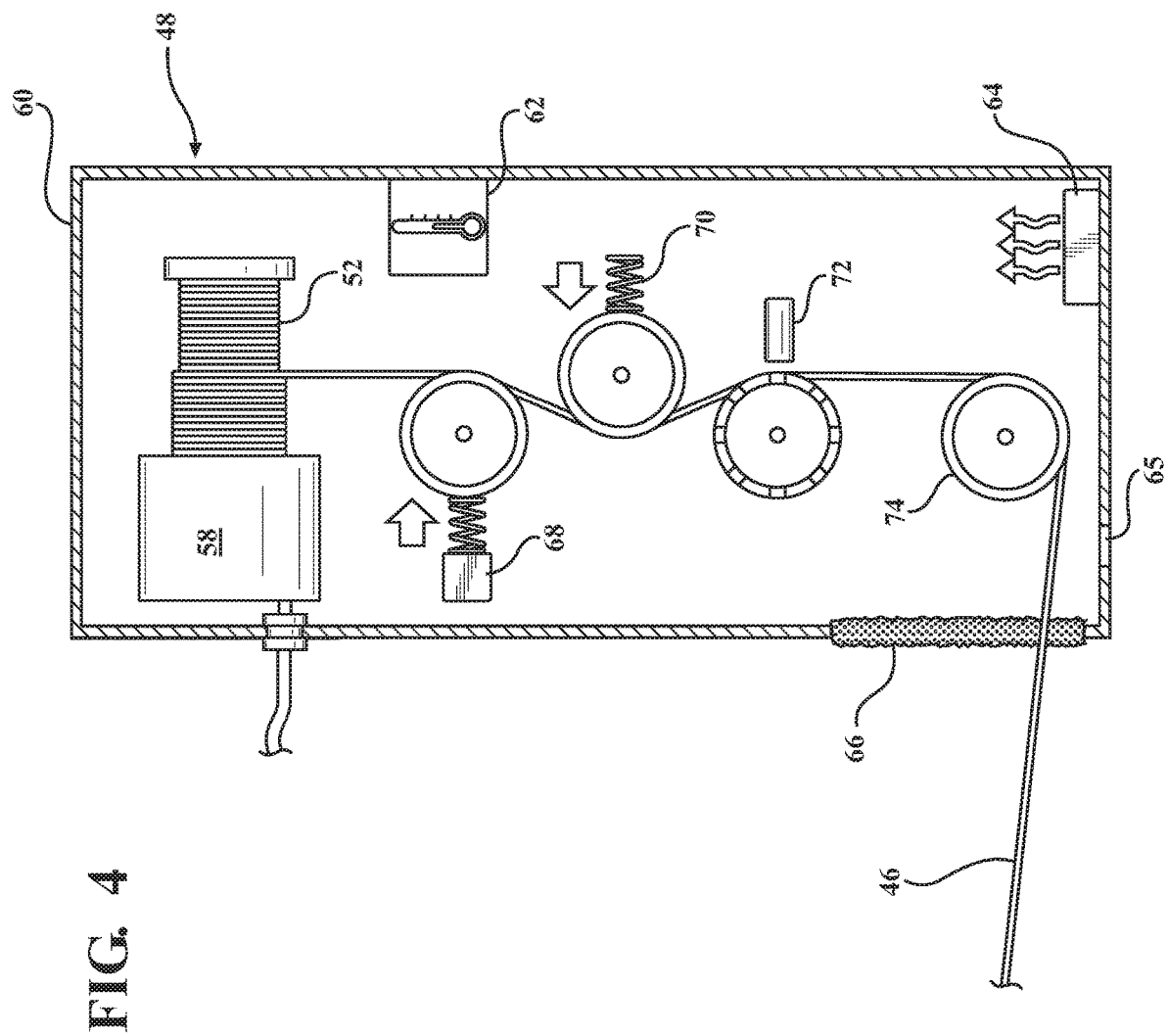
FIG. 4 is a highly simplified view of a windlass according to one embodiment of the invention.

It may be convenient to locate additional components and features inside the motor enclosure 60 which may or may not necessarily be considered part of the windlass 48. FIG. 4 suggests also the inclusion of a high-tension sensor 68 mounted so as to operatively engage the drive cable 46 for assessing tension in the cable. Similarly, a low-tension sensor 70 can be arranged to operatively engage the drive cable 46 for assessing low tension (due to gravitational forces) in the drive cable 46. Easing the drive cable 46 further after detecting low tension will slacken the drive cable 46. Still further, a cable length encoder 72 operatively engages the drive cable 46 for assessing changes in the effective length of the drive cable 46. The cable length encoder 72 measures the linear distance of drive cable 46 that moves through the motor wiper port 66, as well as its direction (in or out). It may be possible and/or desirable to combine some or all functions (high and low tension, length) into a unitary sensor unit rather than having multiple separate devices. The example of FIG. 4 also depicts an optional take-up pulley 74 in the motor enclosure 60 positioned so as to optimally route the drive cable 46 through the wiper port 66. Those of skill in the art can envision alternative arrangements in which the take-up pulley 74 might be omitted or configured in another form. These and other elements of the system 20 may be located inside or with respect to the motor enclosure 60. It may be possible and/or desirable to locate some or all of the sensors 68-72 in other areas of the winch assembly 44.

Figure 2:
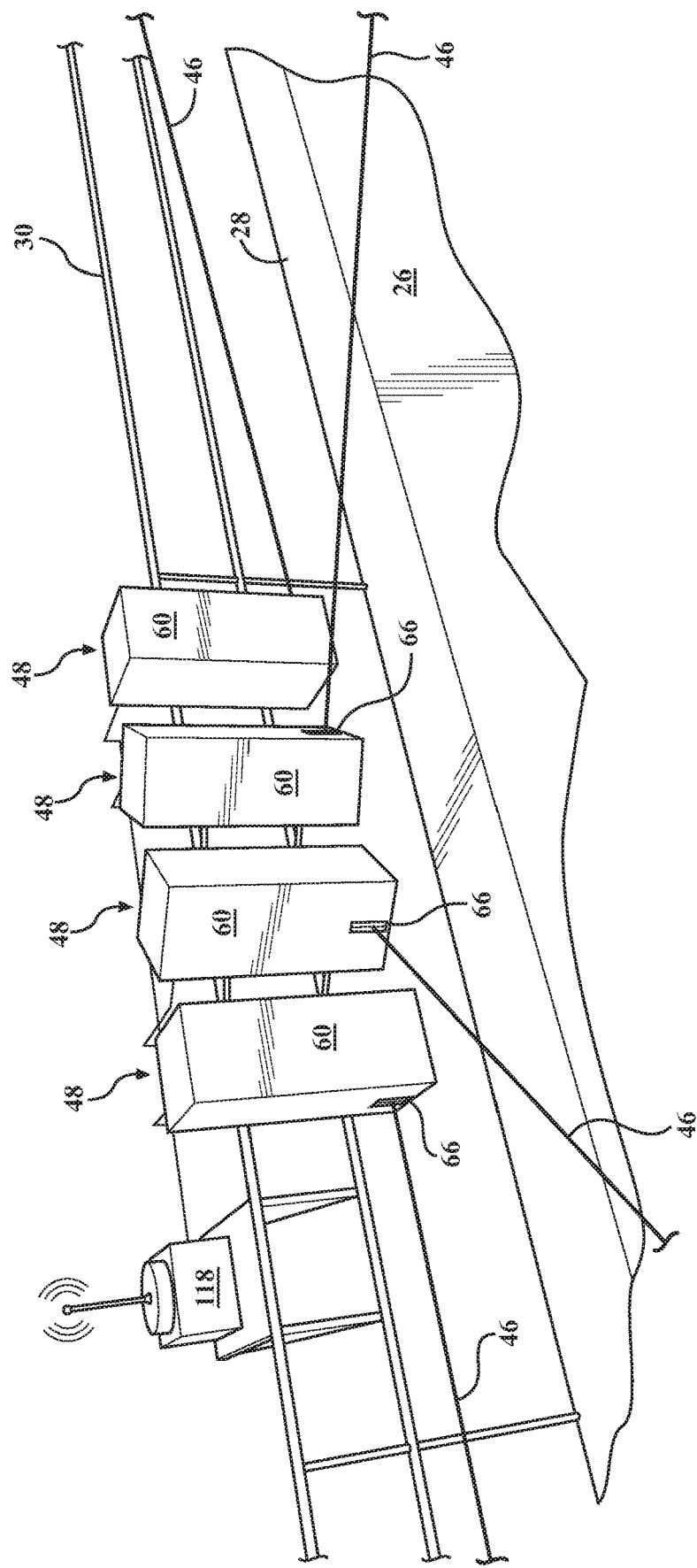
FIG. 2 is a front perspective view showing the several windlasses of the system supported on a guard rail and all electrically connected to a main controller device.
Figure 3:
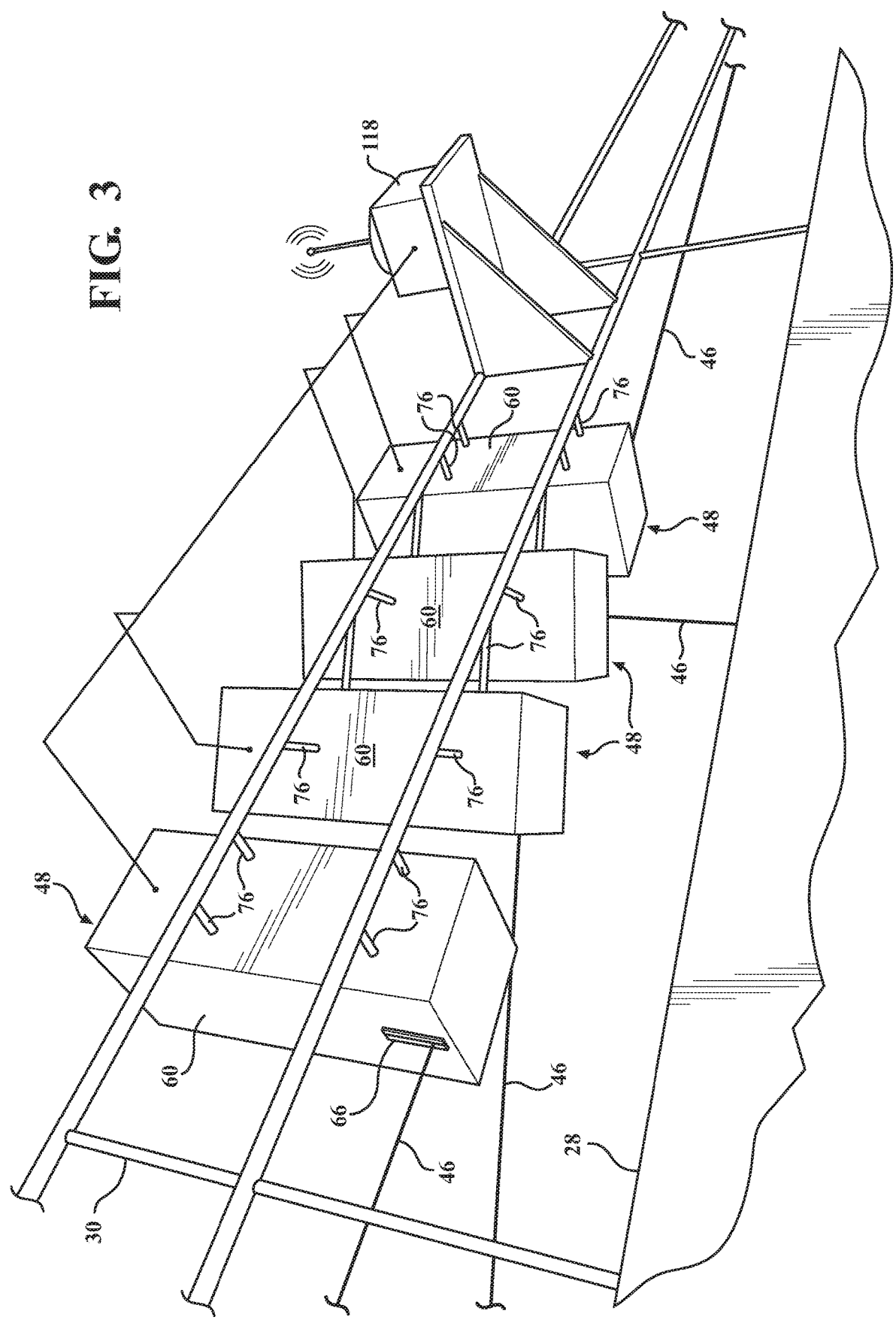
FIG. 3 is a rear perspective view of the windlasses and main controller of FIG. 2.

In almost all envisioned cases, the windlass 48 will be fixed or anchored in some fashion with respect to the operating volume 22, and more particularly with respect to at least one sidewall 26 thereof. For this purpose, it may be expedient to anchor the motor enclosure via one or more adjustable braces 76. These adjustable braces 76 may be designed to enable angular positioning of the motor enclosure 60 for optimal alignment with respect to the associated draw points A. See, for example, FIG. 3 showing four different motor enclosures 60 each oriented so that its respective drive cable 46 can extend directly toward a different draw point A. The example of FIGS. 1-3 is that of a waste water treatment facility in which a guard rail 30 forms a perimeter above the sidewalls 26. The adjustable braces 76 may be designed to attached directly to the guard rail 30 or other feature of the particular application.

The cable router, generally indicated at 50, is located with respect to the draw point A of the associated winch assembly 44. The cable router 50 serves to smoothly change the direction of, and to efficiently transmit force through, the drive cable 46 as it transits the draw point A. In other words, a section of the drive cable 46 is perpetually constrained by the cable router 50 to run through the associated draw point A making a fluid transition toward the carrier 32. As the carrier 32 moves within the operating volume 22, each draw point A shifts. Maintaining a smooth transition of the drive cable 46 through this dynamically shifting point in space is the function of the cable router 50. That is to say, the draw point A is (typically) constantly shifting its location in space, albeit within a fairly small range of motion. The cable router 50 is thus required to accommodate complex motions so that the drive cable 46 can be routed or guided toward and away from the carrier 32 depending on the turning direction of the spool 52.

The configuration of the cable router 50 is highly variable depending upon the situation and the location of the windlass 48. In some contemplated situations, the windlass 48 and cable router 50 can be combined into a compact integrated unit in which case the aforementioned take-up pulley 74 could be replaced with a more sophisticated construction that enables dynamic movement to track with the shifting draw point A. (See for example FIG. 12.) In other contemplated situations, the windlass 48 and cable router 50 are distinct units located some distance from one another. For example (but not illustrated), the windlasses 48 may be stationed on or near the top of the sidewall 26 directly below, or perhaps closely adjacent to, the associated cable router 50. Thus, in a situation where the draw points A are located relative to the four corners of a rectangular tank for example, each windlass 48 might be grouped with its associated cable router 50 at a respective corner. However, in the depicted examples, all windlasses 48 are congregated together on a designated section of guard rail 30, relatively far away from their respective cable routers 50. As can therefore be appreciated, the cable routers 50 thus enable a wide variety of design options for the system 20 and for the locational choices available for the winch assemblies 44.

Figure 6:
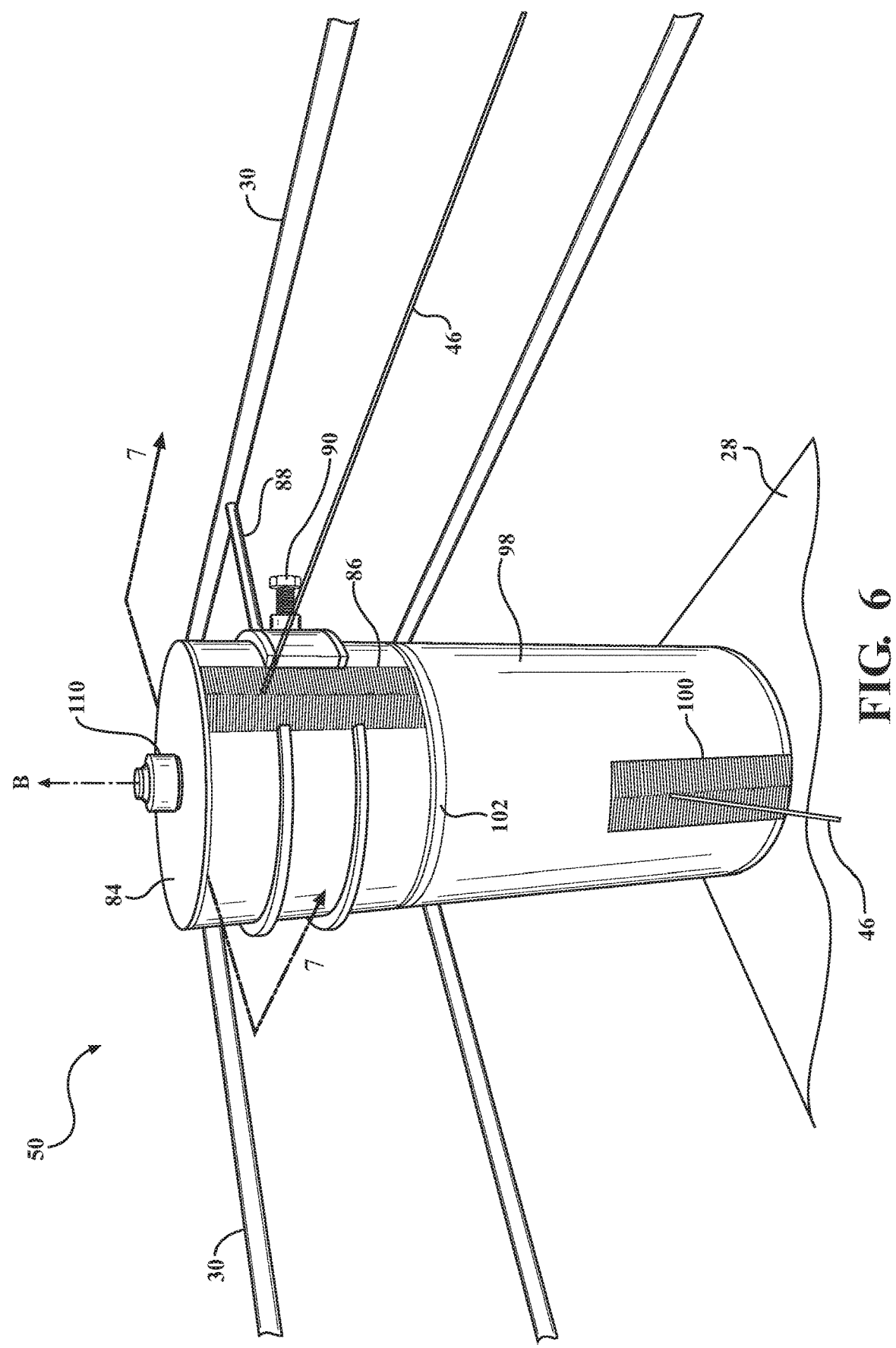
FIG. 6 is a perspective view of a cable router according to one exemplary embodiment of the invention.
Figure 7:
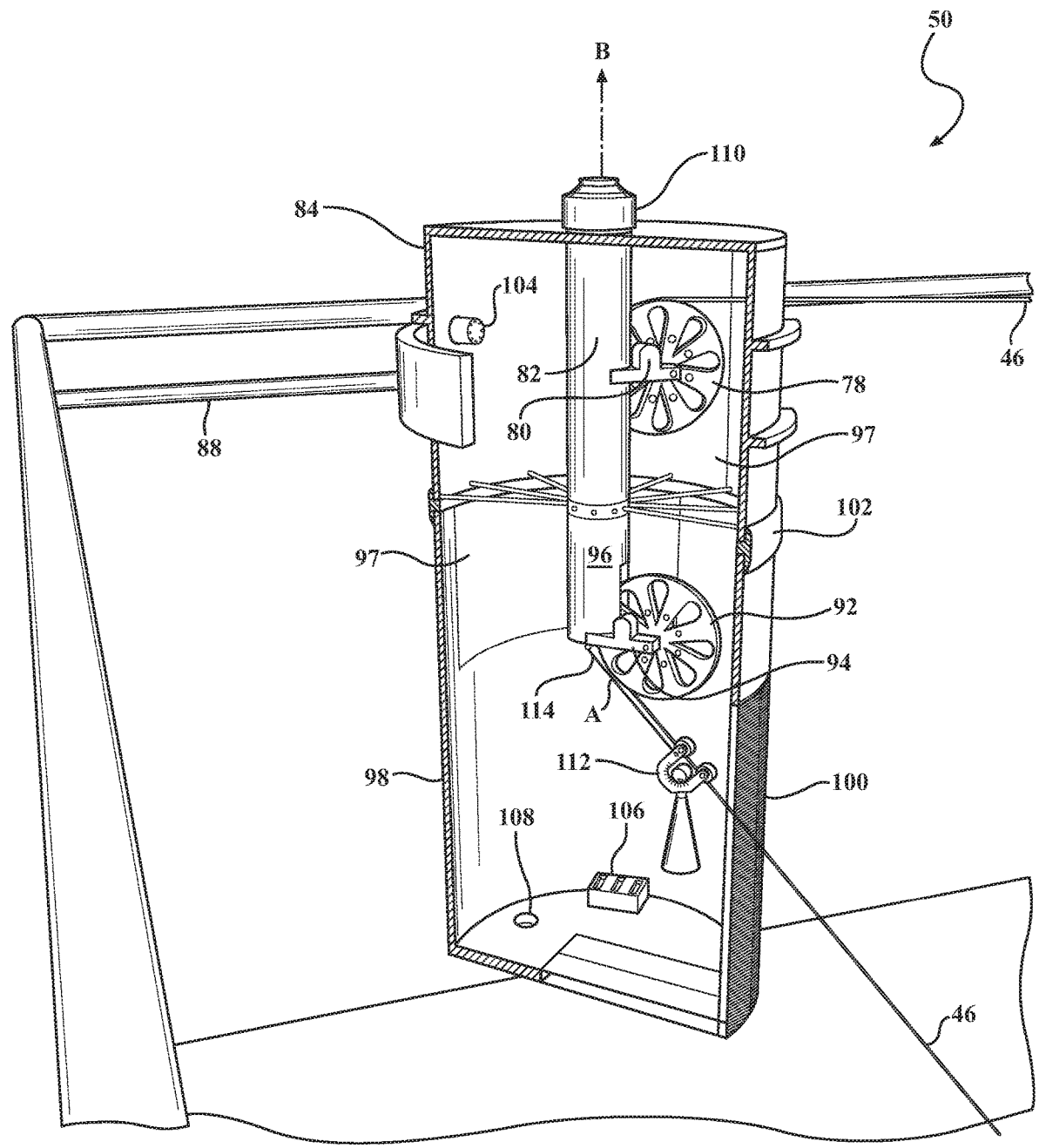
FIG. 7 is a cross-sectional view of the cable router as taken generally along lines 7-7 in FIG. 6.
Figure 8:
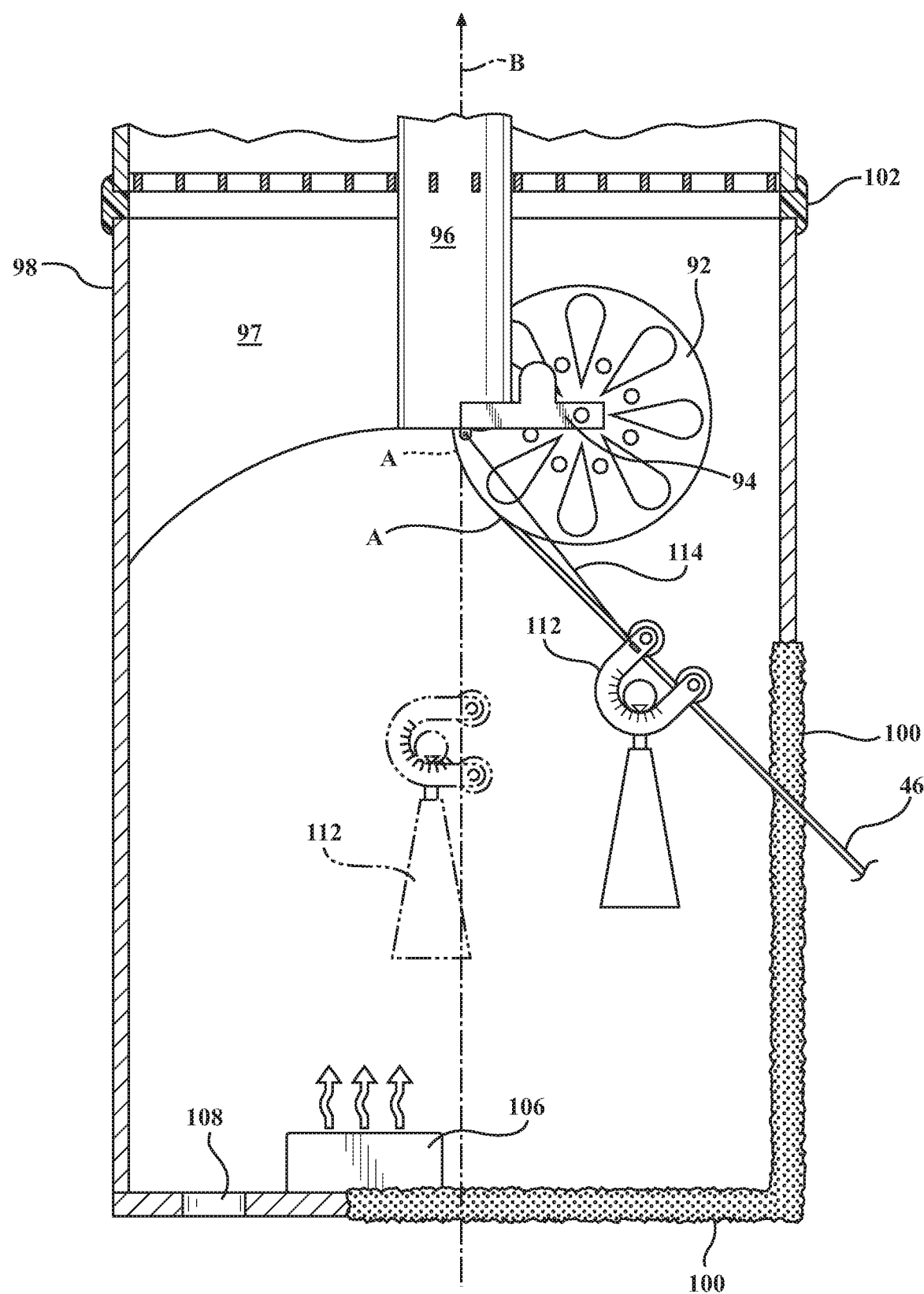
FIG. 8 is a fragmentary cross-sectional view showing the vertical angle encoder in two different positions.

Looking specifically at the illustrated examples shown in FIGS. 6-8, the cable router 50 is depicted as a stand-alone unit or sub-assembly within each winch assembly 44. The cable router 50 shown here includes an upper pulley 78 supported for rotation within an upper bracket arm 80. The upper pulley 78 is a grooved wheel designed to accommodate the diameter of the drive cable 46. The upper bracket arm 80 is, in turn, supported on an upper shaft 82 that is centered along a vertical swing axis B. In the example of FIGS. 7 and 8, the upper shaft 82 is hollow and the upper pulley 78 is arranged so that its grooved outer edge lies generally tangent to the swing axis B. From the windlass 48, the drive cable 46 wraps over the top of the upper pulley 78 and extends straight down the inside of the upper shaft 82 along the swing axis B.

The upper pulley 78 is optionally sheltered within an upper pulley enclosure 84, as shown in FIG. 7, as may be needed to protect from wind, ice, etc. The upper pulley enclosure 84 may be formed from any material suitable for the intended operating environment. In some applications, it is desirable to thermally insulate the upper pulley enclosure 84. Provision is made for the drive cable 46 to pass through the upper pulley enclosure 84 by way of an upper port 86. The upper port 86 may be a simple hole or slot in the upper pulley enclosure 84 or configured to scrape debris from the drive cable 46 as it transits therethrough and retain heat. In the illustrated examples, the upper port 86 is fitted with brushes and arranged so that the drive cable 46 passes between the opposing bristle tips. Of course, the brushes could be replaced with other suitable low-friction wiper designs or mechanisms. Supports 88 secure the cable router 50 in position with respect to the windlass 48 and with respect to the operating volume 22. In the case of FIGS. 6 and 7, the supports 88 are shown simply attaching to the guard rails 30 and suspending the upper pulley enclosure 84 above the operating volume 22 in the vicinity of the associated draw point A. The supports 88 are shown with a simple cuff-like feature to represent any manner of mechanism that will enable the upper pulley 78 to be aimed toward its associated windlass 48. It is desirable that the drive cable 46 engage the grooved outer rim of the upper pulley 78 in an aligned manner. When an upper pulley enclosure 84 is used, it is preferable that both upper pulley 78 and its port 86 are moveable to achieve the desired alignment with respect to the windlass 48. FIG. 6 shows a simple bolt 90 that can be tightened to lock the position of the upper pulley enclosure 84 to retain a set position. Of course, other constructions will permit different types of locking devices so that the upper pulley 78 will not inadvertently fall out of alignment in use.

The cable router 50 further includes a lower pulley 92 supported for rotation within a lower bracket arm 94. The lower pulley 92 may be configured as a grooved wheel designed to accommodate the diameter of the drive cable 46, similar to the upper pulley 78. The lower bracket arm 94 is supported on a lower shaft 96 that is concentrically located with the upper shaft 82 about the swing axis B by one or more braces 97. Like the upper shaft 82, the lower shaft 96 is hollow in this example. However, the lower pulley 92 is designed to swing in an arcuate path around the swing axis B. The lower pulley 92 is arranged so that its grooved outer edge lies tangent to the swing axis B throughout the full range of arcuate travel about the swing axis B. This could be accomplished by a rotary joint between the lower bracket arm 94 and lower shaft 96, or between the lower shaft 96 and the upper shaft 82, or by some other design. From the upper pulley 78, the drive cable 46 extends straight down along the swing axis B and onto the grooved edge of the lower pulley 92.

In this manner, the upper 80 and lower 94 bracket arms are independently supported, with at least the lower bracket arm 94 configured for arcuate motion about the common vertical swing axis B. The section of the drive cable 46 that transits between the upper pulley 78 and lower pulley 92 will thus always travel through the hollow upper 82 and lower 96 shafts along (i.e., be co-linear with) the swing axis B.

As the carrier 32 moves about the operating volume 22, each drive cable 46 naturally tracks with it. From the reference position of any one draw point A, its associated drive cable 46 will always point like a vector toward the carrier 32. The carrier 32 lies at the common intersection of the vectors from all drive cables 46 in the system 20. As the lateral angular disposition of the drive cable 46 shifts, the lower pulley 92 will slavishly follow in a sweeping path about the swing axis B. The term lateral here is intended to mean a path in a plane perpendicular to the swing axis B, i.e., movement in a horizontal plane. Of relevance to this invention is the lateral angle of the drive cable 46 as measured from a horizontal reference axis, and also the vertical angle of the drive cable 46 as measured from the vertical. The lateral angle is thus measured between a reference axis and the drive cable 46. Technically speaking, the lower pulley 92 serves as a surrogate for the vector direction of the drive cable 46, and therefore it is also accurate to say that the lateral angle is measured between the reference axis and the lower pulley 92. It has been found expedient to measure the lateral angle clockwise (as viewed from above looking down) from a designated X-axis of the operating volume 22. The vertical angle is defined as a path in a plane parallel to the swing axis B. Many of those skilled in the art of cable robotics are educated with advanced degrees in mechanical engineering, and therefore will readily understand these conventions. The lateral and vertical angles will be described in greater detail subsequently.

The point at which the drive cable 46 separates from the lower pulley 92, in the direction of the carrier 32, is the draw point A. As perhaps best shown in FIG. 11, the draw point A will shift closer to the back of the lower pulley 92 (3 or 9 o'clock position) as the carrier 32 moves closer, and conversely the draw point A will shift toward the bottom of the lower pulley 92 (6 o'clock position) as the carrier 32 moves farther away (unless the length of the drive cable 46 is changed in such a way that the direction of the original vector is unchanged) In addition, as the carrier 32 moves to the left and right inside the operating volume 22, the draw point A will swing arcuately about the swing axis B. Thus, the draw point A is seen to dynamically shift its position throughout the operation of the system 20. The cable router 50 can thus be seen to constrain and manage the drive cable 46 as it transits the draw point A. The swiveling nature of the lower pulley 92 facilitates smooth changes in the direction of and the transmission of force through the drive cable 46 caused by positional changes of the carrier 32 within the operating volume 22.

Like the upper pulley 78, the lower pulley 92 may also be sheltered within a lower pulley enclosure 98. Provision is made for the drive cable 46 to pass through the lower pulley enclosure 98 by way of a lower port 100. As stated previously, there is flexibility in design of the enclosures 84, 98 depending on local requirements. Regardless of the shape of the lower pulley enclosure 98, the size (or design) of the lower port 100 must accommodate the full range of expected motion of the drive cable 46, which will meet or exceed the full lateral angular and vertical spans of the operating volume 22 as measured at the associated draw point. The full lateral angular and vertical spans are about 90 degrees each in the examples. In the illustrated examples, the lower port 100 is fitted with brushes so that the drive cable 46 passes between opposing bristle tips. Wiper and heat retention strategies other than brushes may alternatively be employed.

The lower pulley enclosure 98, or at least the lower port 100, must accommodate movements of both the lower pulley 92 and the transiting drive cable 46 as the carrier 32 treks about the operating volume 22. This accommodation can be accomplished in a variety of ways. FIGS. 6 and 7 portray one possible strategy in which a rotary connection at the interface between the upper 84 and lower 98 pulley enclosures is provided. A suitable weather seal 102 may be needed to protect the rotary joint in exposed settings. Lateral pressure applied by the drive cable 46 to the edges of the lower pulley 92 and to the contacting edges of the lower port 100 will urge the lower pulley enclosure 98 to rotate so that proper alignment with the lower pulley 92 is automatically maintained. With the braces 97 in the lower pulley enclosure 98, the enclosure 98 will always move in sync with the lower pulley 92. The drive cable 46 will tend to swing them both side-to-side. The rotation of the lower pulley enclosure 98 thus allows the cable 46 to move throughout the range of lateral angles, while the lower port 100 allows the cable 46 to move throughout the range of vertical angles.

The length of the lower port 100 slightly exceeds the range of possible vertical angle motion (−90 degrees) so that full accommodation for drive cable 46 movement is made in the vertical angle direction. Of course, other more sophisticated (or simpler) strategies can be employed to accommodate movements of the drive cable 46 in normal use. And in cases where the drive cable 46 is wiped as it passes through the lower port 100, to assure the wiping action of the lower port 100 is not sacrificed as the drive cable 46 moves in response to positional changes of the carrier 32.

Although the preceding description has portrayed the upper 84 and lower 98 pulley enclosures as separate components, it may be possible to design them in some partially or fully integrated fashion. And as mentioned previously, in some contemplated embodiments (e.g., FIG. 12) the windlass 48 can be integrated with the cable router 50 in which case the several enclosures 60, 84, 98 may also be integrated (or just the motor enclosure 60 and lower pulley enclosure 98 in cases where the upper pulley 78 might be omitted altogether). But returning to the example of FIG. 7, a semi-combined upper 84 and lower 98 pulley enclosures unit is shown with a rotary joint at the interface (protected by a weather seal 102). In this embodiment, the two pulley enclosures 84, 98 can be open to one another so that they share a common interior space that can be temperature-monitored by a common thermostat 104 and heated by a common heater 106 that is operatively connected to the thermostat 104 for automated service. Naturally, in applications requiring freeze prevention both the upper and lower pulley enclosures 84, 98 will be thermally insulated. The semi-combined upper 84 and lower 98 pulley enclosures unit may include a drain hole 108 (FIGS. 7 and 8) to vent water accumulations. The motor enclosure 60 and pulley enclosures 84, 98 may be fitted with access hatches (not shown) for periodic inspection and maintenance.

Figure 9:
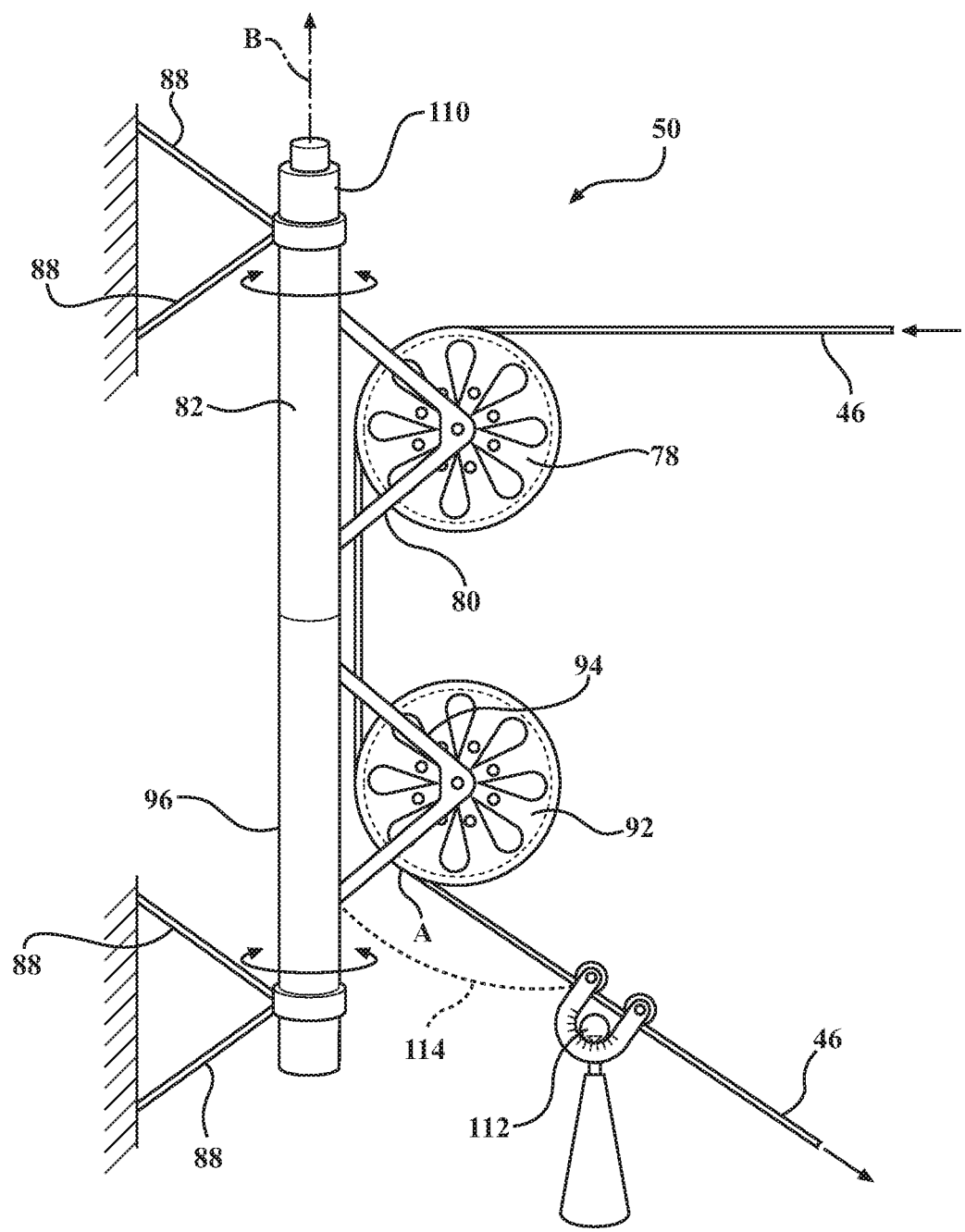
FIG. 9 is a simplified view of an alternative embodiment of the cable router in which the upper and lower pulleys are offset from the vertical swing axis.
Figure 10:
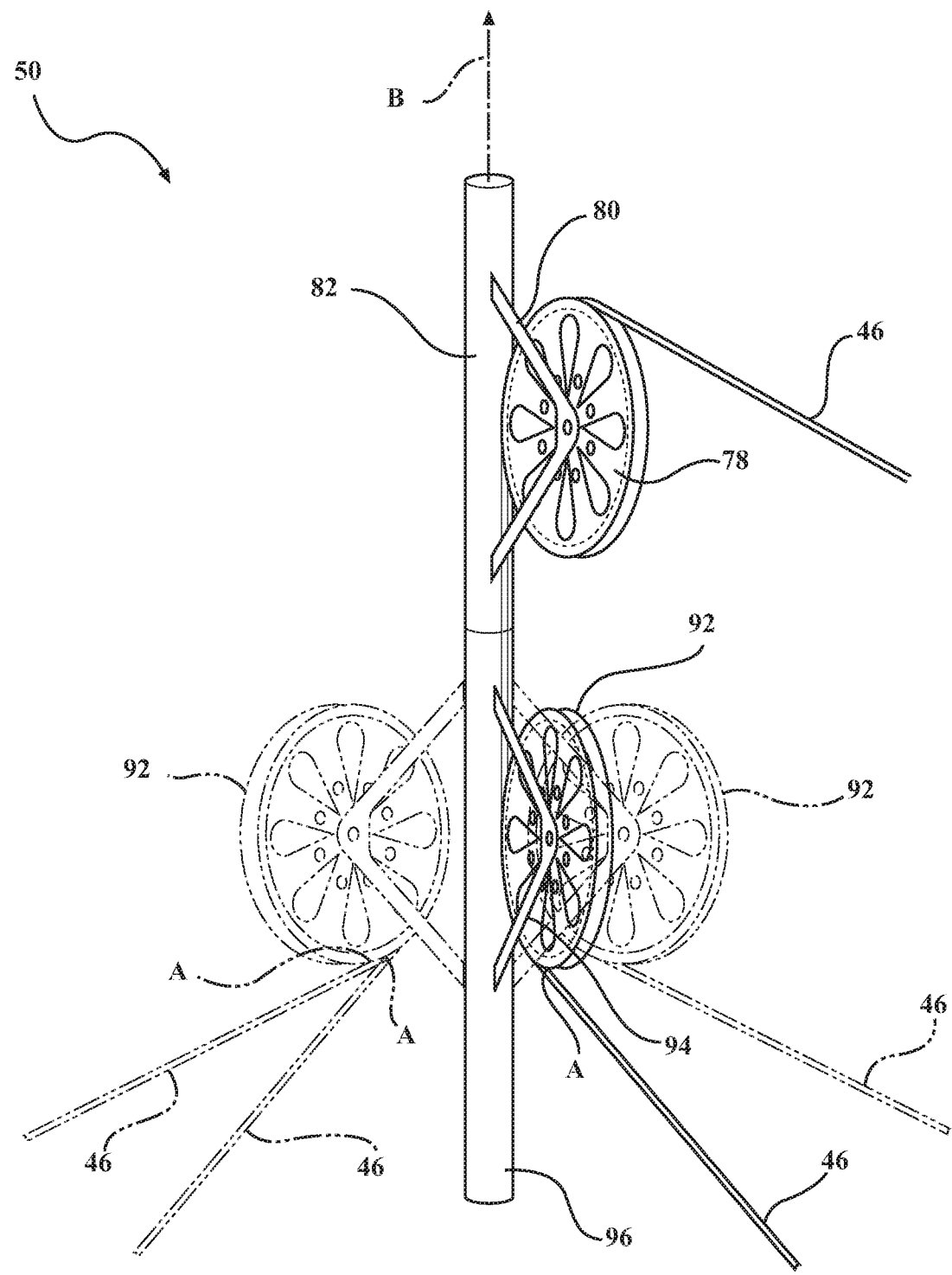
FIG. 10 is a simplified view of the cable router as in FIG. 9 but showing in phantom the lower pulley swept left and right about the vertical swing axis.
Figure 11:
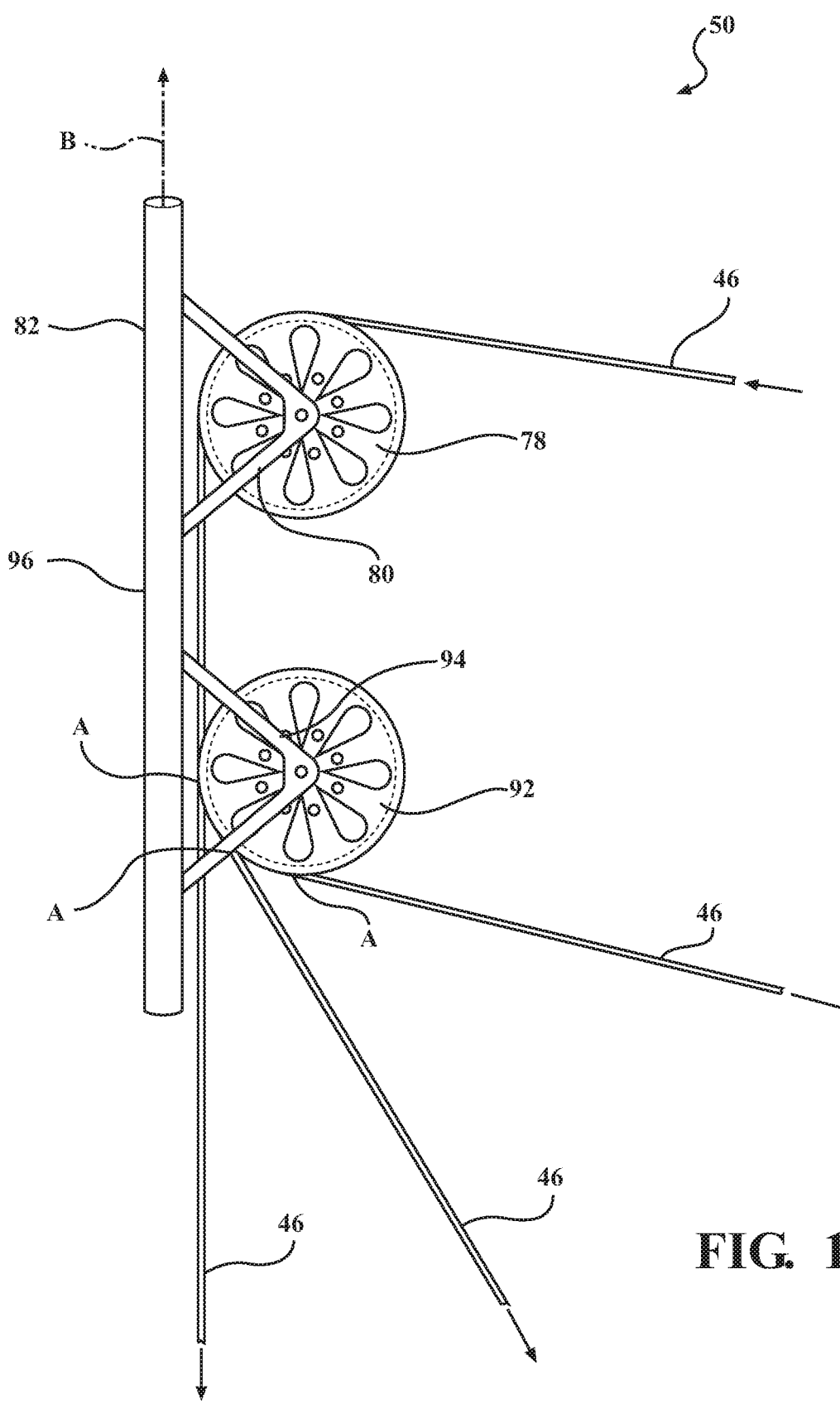
FIG. 11 is a view as in FIG. 9 showing the draw point in three shifted positions due to movement of the drive cable.

FIGS. 9-11 are simplified views of alternative embodiments of the cable router 50. These illustrations represent the fact that many design variations are possible. In these views, the grooved edges of the pulleys 78, 92 are offset from (i.e., not tangent to) the swing axis B. While possibly easier to construct, this arrangement would allow a greater shifting range for the draw point A as the lateral sweep is potentially larger (but the dynamic draw point method is not affected by this apparent disadvantage). In these variations, the upper 82 and lower 96 shafts are not necessarily hollow. Although, the upper shaft 82 in FIG. 9 may need to have at least conduit properties for attachment of a lateral angle encoder 110. The illustration in FIG. 11 suggests a monolithic (integrated) upper 82 and lower 96 shaft which may require the lower pulley bracket 94 to be mounted for lateral pivot about the stationary lower shaft 96.

It should be noted that the previously mentioned cable length encoder 72 could, if desired, be re-located to either the upper 84 or lower 98 pulley enclosures instead of inside the motor enclosure 60. Indeed, it is even possible to integrate the cable length encoder 72 into either (or both) of the upper 78 and lower 92 pulleys. This optional configuration is depicted in FIGS. 7 and 8 in the form of a bump-like sensor built into the respective upper 80 and lower 94 bracket arms and small sensory targets embedded in the spokes of the respective upper 78 and lower 92 pulley wheels. Those of skill in the art will envision many alternative configurations for the implementation of the cable length encoder 72.

As previously mentioned, the purpose of the cable router 50 is to direct its associated drive cable 46 from the windlass 48 to the carrier 32 while passing through a dynamically-shifting draw point A. The cable routers 50 are configured so that the positions of the draw points A can be easily described, mathematically, in the designated Cartesian coordinate system. It will be understood that references throughout to position of the carrier 32 serve as a proxy for the actual thing of interest, namely the position of the end-effector 36. The draw points A are the reference from which angular measurements of each drive cable 46 are measured. Continuous tracking of the lateral and vertical angles for each of the drive cables 46, relative to their respective references, allows for dynamic calculation of the position of the draw points A. In the context of the present invention, the vertical angle is understood to be the angle from vertical whereas the lateral angle is the angle from a reference axis in a horizontal plane. The draw point A coordinates and angle data and cable lengths can then be used to calculate/estimate the position of the carrier 32 (i.e., of the end-effector 36) within the 3-D operating volume 22.

The cable router 50 manages the transition of the drive cable 46 through the draw point A. These measurements are used to mathematically calculate the instantaneous position of the carrier 32/end-effector 36. However, because the draw points A are dynamic, performing accurate calculations in prior art has always been challenging, especially when larger diameter pulleys are used. To overcome this challenge, each cable router 50 includes a draw point angle tracker. The draw point angle tracker is operatively disposed with respect to its associated cable router 50 to assess the instantaneous lateral and vertical angles of the drive cable 46 vectoring from its dynamically-shifting draw point A toward the carrier 32. The draw point angle tracker includes a lateral angle encoder 110 and a vertical angle encoder 112 as shown in FIGS. 6-8. The lateral angle encoder 110 is configured to assess the instantaneous lateral angle of the drive cable 46 at its draw point A, relative to a horizontal reference axis. The vertical angle encoder 112 is configured to assess the instantaneous vertical angle of the drive cable 46 at the same draw point A. The means by which to assess the instantaneous lateral and vertical angles of the drive cable 46 as it vectors from its draw point A toward the carrier 32 are many. That is to say, many optional devices and strategies can be found in the public literature to perform these angular measurements, either in an integrated/combined unit or via separate devices. The illustrations portray the use of separate and distinct devices to accomplish the vertical and lateral angular measurements, but these are merely offered as examples to those of skill in the art.

The lateral angle encoder 110 is visible in FIGS. 6, 7 and 9. In these examples, which serve in a representative capacity for any suitable device capable of reporting the lateral angle of the drive cable 46, the lateral angle encoder 110 is shown mounted on top of the upper pulley enclosure 84 directly over the swing axis B. The lateral angle encoder 110 transmits a signal, either wirelessly or by wire, to a main controller 118 reporting the instantaneous measured lateral angle of the lower pulley 92, which serves as a proxy for the lateral angle of the drive cable 46. In this configuration, the lateral angle encoder 110 is operatively connected to the lower shaft 96, such as through an extension passing through the hollow upper shaft 82 (not shown). Other configurations are certainly possible. As the lower pulley 92 slavishly tracks with the drive cable 46, the lateral angle encoder 110 measures its horizontal sweep relative to the aforementioned reference axis. In this manner, the lateral angle encoder 110 is configured to assess the instantaneous lateral angle of the lower pulley 92, and thus the lateral angle of the drive cable 46, relative to the reference axis which is fixed in relation to the operating volume 22. For a typical corner-mounted cable router 50 where the corners of the operating volume 22 are all square, the lateral angle range will be 90°. (For a cable router 50 mounted along a flat wall, the lateral angle range is typically 180°. And for a cable router 50 mounted along a flat wall, designed to flip between two separate zones divided by a baffle wall 124 in the operating volume 22, the cable router 50 will have two distinct lateral angle ranges of 90° each) Those of skill in the art will understand that angle ranges may be different for every corner depending on the geometry of the operating volume 22. A single reference or datum will typically be designated from which all of the lateral angles are measured. For simplicity, this is typically the horizontal X axis assigned to the designated Cartesian coordinate system for the operating volume 22. In standard rectangular tank applications, where are lateral angles are measured CW from a common/shared X axis, the lateral angle ranges will be 0°-90°, 90°-180°, 180°-270° and 270°-360°, respectively.

The vertical angle encoder 112 is best seen in FIGS. 7-9 mounted to directly measure the angle of the drive cable 46 from vertical with the draw point A as its vertex. When the drive cable 46 is hanging straight down, the vertical angle is 0°. Naturally, 0° is adopted as an expedient convention. The opposite (180°) would work as well, provided all calculations are derived using a consistent approach. When the drive cable 46 is perfectly horizontal, the vertical angle is 90°. The vertical angle encoder 112 transmits a signal, either wirelessly or by wire, to a main controller reporting the instantaneous measured vertical angle of the drive cable 46. In the illustrated embodiment, the vertical angle encoder 112 is leashed with a tether 114 to prevent it from sliding down the drive cable 46 at lower vertical angles. In this example, the tether 114 is operatively disposed between the vertical angle encoder 112 and the lower bracket arm 94 within the lower pulley enclosure 98. The tether 114 may be configured to transmit at least one of electrical signal and electrical power to/from the vertical angle encoder 112. To reiterate, the illustrations show what is intended to be a representative example of a vertical angle encoder 112; many alternative designs are within the scope of understanding for those of skill in the art.

In a simple embodiment, such as the configuration in FIG. 1 for use in a rectangular operating volume 22, there are four winch assemblies 44 and four respective draw points A. The four windlasses 48 are commonly located near one another on a sidewall 26, whereas the four cable routers 50 and their associated draw points A are located in each corner of the operating volume 22, above the water level (not shown) in the tank. Those of skill in the art will be able to adapt the principles of this invention to other, more complex arrangements where the operating volume 22 is not a basic rectangular shape.

A human operator monitoring the system 20 may do so through a general-purpose computer 116 (FIG. 5) of the type having a non-transitory computer readable medium coded with instructions and executed by a processor to receive position data from a main controller 118, plot position on its screen during operation, show system 20 status, execute operator commands, and the like. The general-purpose computer 116 can be permanently located near the operating volume 22, such as in an observation building, a mobile device like a tablet computer or smart phone operating on a local wireless connection (e.g., Wi-Fi or Bluetooth®), or some remote device utilizing an internet connection. The computer 116 may also be multiple computing devices—local, mobile and/or remote. The main controller 118 may be connected to the computer 116 for local control and display. Where the system 20 is to be connected to a plant-wide SCADA system, the main controller 118 can interface with the SCADA system, without the need for the computer 116. Communication between the main controller 118 and computer 116 and/or SCADA system can be wired or wireless.

The main controller 118 is shown in a representative capacity in FIG. 1-3 as being hard-wired to each winch assembly 44 via its respective windlass 48. The main controller 118 is also expected to include a non-transitory computer readable medium coded with instructions and executed by a processor to perform the steps of: control operation in local mode, move in response to commands from computer in Remote mode, perform drive cable length calculations for each move operation, signal motor controllers to operate the motors 58 when required, receive encoder information from the cable length encoders 72, receive encoder data from the draw point angle tracker encoders 110, 112, estimate carrier 32 position from encoder data, and the like.

Figure 5:
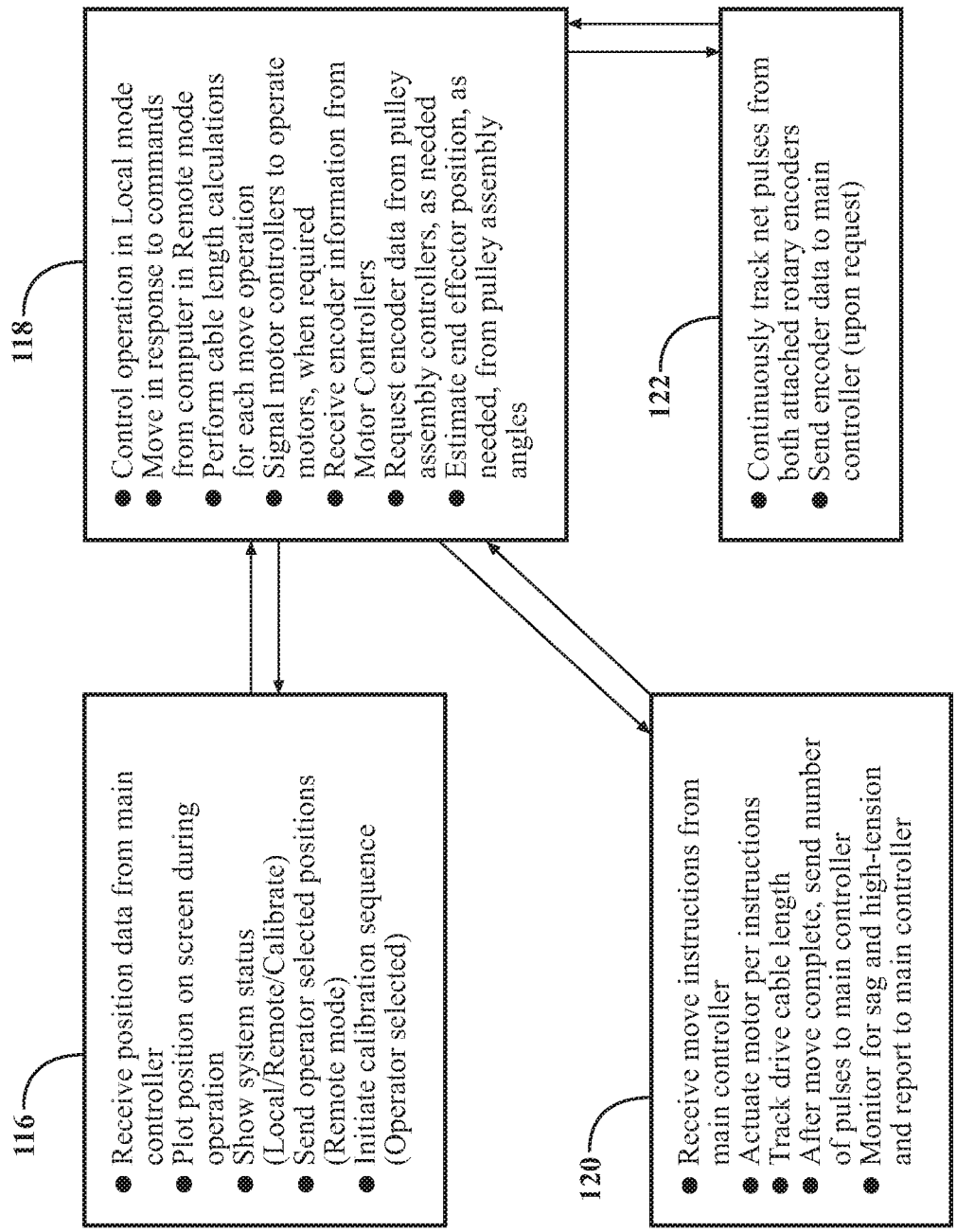
FIG. 5 is a schematic view of the electronic control system according to one embodiment of the invention.

The control system for the stand-alone system 20 is shown schematically in FIG. 5. The main controller 118 is used for overall control of the system 20. The system 20 may include a windlass controller 120 coded to receive instructions from main controller 118, actuate motors 58 per instructions, track drive cable 46 length, send number of cable length encoder 72 pulses to main controller 118 after carrier 32 move is complete, monitor for hightension and low tension via signals generated by the sensors 68, 70, and report to main controller 118. The system 20 may also include a pulley assembly controller 122 coded with instructions and executed by a processor to continuously track net pulses from all attached/associated encoders and send encoder data to the main controller 118 upon request. All communications can be done via wired connection or wirelessly. The main controller 118 thus interfaces with all of the windlass controllers 120 and all of the pulley controllers 122.

The movement of the carrier 32 is controlled by changing the respective drive cable 46 lengths, a general method understood by those skilled in the art. For purposes of this invention, the length of each drive cable 46 is considered to be the difference between the dynamic draw point A and the distal end 54 of the drive cable 46 (which corresponds to the attachment at the carrier 32. In applications that use a concentric ring 38 about the carrier 32, the drive cable 46 lengths are calculated relative to the point of attachment to the ring 38. The geometric center of the ring 38 (and carrier 32) can be described mathematically from these attachment points and used in calculations and estimating methods to locate the carrier 32 in the operating volume 22. The draw point A for a single winch assembly 44 is shown shifted to three different positions in FIG. 11, corresponding to three different end-effector 36 positions.

A method for calculating the position of the dynamic draw point A is described briefly below and referred to herein as the dynamic draw point method. The positions of the dynamic draw points A are determined as a part or component or step in determining the precise position of the end-effector 36 within the operating volume 22. FIG. 11 shows that, as a given drive cable 46 is moved up or down, the point at which it separates from the lower pulley 92 (i.e., the draw point A) will change. FIG. 10 shows that as the lower pulley 92 pivots about the swing axis B, the dynamic draw point A moves in an arc, as a function of the lateral angle of the lower pulley 92. The movements of the draw point A result in changes in the effective length of the drive cable 46, even if the respective spool 52 has not been rotated by its drive motor 58. Whenever the carrier 32 moves, the effective length of every drive cable 46 must therefore be corrected as part of this dynamic draw point method. The formulas for calculating the dynamic draw points A for each drive cable 46, including corrections to effective line lengths, require no more than basic trigonometry and geometry derivations well-known to those skilled in the art and therefore will not be presented here.

This invention also includes apparatus and method for estimating the end-effector 36 position from angle measurements produced by the draw point angle tracker and drive cable 46 lengths. The angle data produced by the draw point angle tracker are first used to calculate the current locations of the dynamic draw points A. This is an extension of the dynamic draw point method discussed above, and can be readily derived by those skilled in the art using basic-level trigonometry. Once the dynamic draw points A are known, the end-effector 36 position is determined from the dynamic draw point A positions and the measured angle data and the cable lengths.

The mathematical determination of the end-effector 36 position in 3-D, from drive cable 46 lengths and/or drive cable 46 angles (lateral and vertical), is complex, and therefore estimation of the end-effector 36 position using trial and error method is considered expedient to enable workable real-time determinations using low-cost processing equipment. This description uses the term estimation for determining the end-effector 36 position from the angle and cable length data, as a trial and error solution is efficient for microcontroller use.

The following example is provided as a general description of the method of movement for a system 20 operating in a rectangular operating volume 22, with four drive cables 46 each routed through a respective draw point A that is managed by a cable router 50 mounted in each corner of the operating volume 22. Drive cable 46 length and angle data are used for position estimation, ignoring data for any drive cable 46 that has been deliberately slackened.

The general method is to minimize the sum of squares of the differences between calculated and measured angles, to determine the coordinates of the end-effector 36 position. An acceptable solution can be achieved by trial and error. Properly set constraints, as understood by those skilled in the art, allow for rapid solution of the optimization, even on a microprocessor with limited processing power. The general steps of the solution may include:

One or more drive cables 46 are slackened, as needed.

The vertical and lateral angles for all non-slack drive cables 46 are detected and provided to the main controller 118.

The main controller 118 calculates appropriate constraints on x, y, and z coordinates, to reduce processing time.

The objective function is the sum of squares of the difference between calculated and measured angles, for the selected angles.

The lateral and vertical angles in the objective function are a function of x, y, and z, in the selected Cartesian coordinate system (based on calculations understood by those skilled in the art).

The main controller 118 minimizes the objective function subject to constraints on x, y, and z, to solve for the coordinates of the end-effector 36 position. The system is solved by trial and error, looping through the possible permutations of x, y, and z. The increment (i.e., mesh size) is based on the required accuracy/precision.

The main controller 118 may repeat the solution, over a smaller range of values for x, y, and z, using a finer mesh size, if higher accuracy/precision required.

The invention is also capable of performing automatic calibration, following initial setup or as part of routine operation, using a combination of drive cable 46 length tracking, corner angle data, and tension sensing. The following gives a general description of the method for a system 20 operating in a rectangular operating volume 22, with four drive cables 46, with a cable router 50 mounted in each corner.

The following general steps are suggested as one possible approach, and presumes that the operating volume 22 dimensions and the coordinates of the cable routers 50 have already been measured and entered in the control screen of the computer 116:

Operator manually operates system 20 to position the end-effector 36 to hang directly below the draw point A of one winch assembly 44, which will be identified as draw point $A_0$. The operator manually operates the system 20 to position the remaining drive cables 46 for the other winch assemblies 44 are in a low-tension or slack condition. This initial positioning step could also be automated, by those skilled in the art.

Operator initiates automatic calibration sequence.

The main controller 118 sets the vertical angle for the vertical angle encoder 112 associated with draw point $A_0$ to 0° (i.e., hanging straight down). The characteristics of the vertical angle encoder 112 are known, so setting 0° is sufficient to be able to read any vertical angle from 0° to 90° (Assuming all corner assemblies are at the same elevation, the vertical angle would not exceed 90°). The main controller 118 then moves the end-effector 36 to hang directly below the draw point A of an adjacent winch assembly 44, which will be identified as draw point $A_1$, and slackens the other three drive cables 46. The main controller 118 sets the vertical angle for the vertical angle encoder 112 associated with draw point $A_1$ to 0°. The main controller 118 uses a similar strategy to zero the vertical angle measurements for the remaining two vertical angle encoders 112 associated with draw points $A_2$ and $A_3$ so that all four corners have been calibrated for 0° vertical.

The main controller 118 next moves the end-effector 36 to a position halfway between draw point $A_0$ and draw point $A_1$. The other two drive cables 46 associated with draw points $A_2$ and $A_3$ are slackened. The lateral angles for the lateral angle encoders 110 associated with draw points $A_0$ and $A_1$ are set to the appropriate values, based on the established Cartesian coordinates for the system 20. The main controller 118 uses the same strategy to calibrate the lateral angle encoders 110 for the remaining draw points $A_2$ and $A_3$.

Next, the main controller 118 moves the end-effector 36 between a series of at least two points, to calibrate the drive cable 46 lengths and the drive factors. The drive factors are defined as the length per revolution of the spool 52, or perhaps more precisely the length per pulse of the cable length encoder 72. The main controller 118 moves the end-effector 36 to a set Point S. The drive cable 46 lengths are calculated using the position estimation technique described and set as current values. The main controller 118 then moves the end-effector 36 to a target Point T. The controller generates motor 58 drive commands using the calculated line lengths for Points S and T, plus the default (or previously stored) drive factors. When the end-effector 36 stops moving, the main controller 118 estimates its position using the measured draw point angles (from the draw point angle tracker) and calculates the respective drive cable 46 lengths. If the carrier 32 unit stops at Point T', rather than the target Point T, and Point T' is not within an acceptable tolerance, the drive factors are calibrated. Using the respective changes in drive cable 46 lengths and the revolutions (or encoder pulses) used for the respective motor 58 drive commands, the main controller 118 can calculate new drive cable 46 drive factors and overwrite the previous values in memory. Some or all of these calibration steps may be repeated, as necessary, to arrive within acceptable tolerance limits for target Points S & T. End-effector 36 position estimation may be improved by slackening at least one drive cable 46, if needed for improved accuracy and precision.

Following initial calibration, the system 20 can be programmed for dynamic calibration during normal operation which may be necessitated due to cable stretch and other wear factors. The system 20 can evaluate and tune drive cable 46 lengths and drive factors after a typical end-effector 36 movement between any two points in the operating volume 22.

During normal operation, the angle data can also be used by the main controller 118 to adjust the end-effector 36 position to meet an operator specified tolerance. For example, the end-effector 36 is moved from Point S to Point T, based on calculated changes in drive cable 46 lengths. Angle data are then used to determine the actual Point B'. If Point B' is not within tolerance (i.e., <X length units from target Point B), the controller can move the end-effector 36 (iteratively, if needed) and verify that its position meets the required tolerance.

Figure 12:
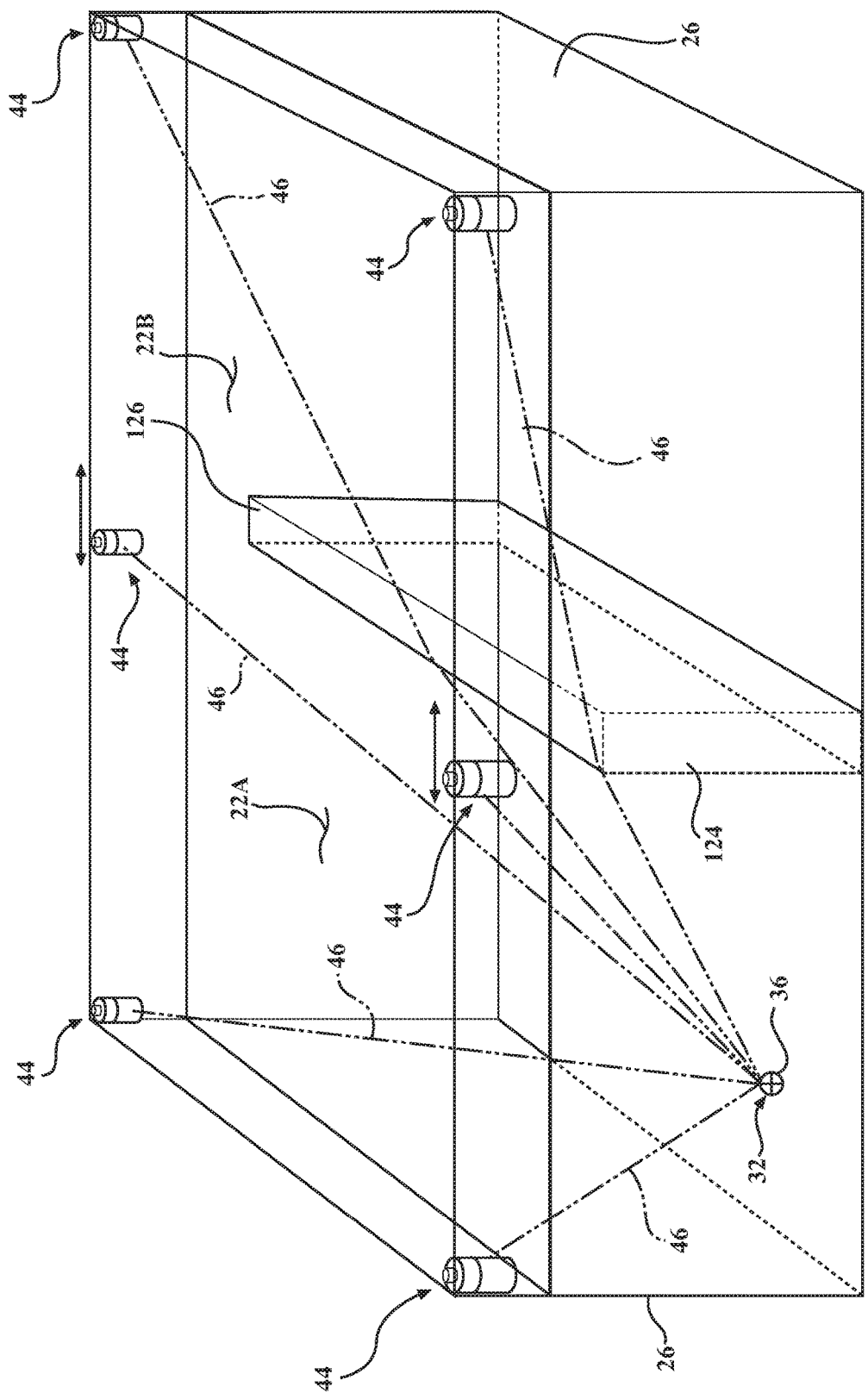
FIG. 12 is a perspective view of a multi-zone tank fitted with a modified version of the system so as to accommodate two distinct operating volumes.

FIG. 12 exemplifies situations in which a large tank is subdivided by an obstruction, such as a bridge or baffle wall 124, into multiple zones. In effect, each zone can be considered a separate but adjacent operating volume 22. In situations like this, the same carrier 32 and end-effector 36 can be used, albeit alternately, in the multiple zones. Furthermore, it is possible to economize by enlisting the winch assemblies 44 bordering two adjacent operating volumes 22 to serve in each zone, thereby reducing the overall cost of the system 20. This embodiment allows multiple zone operation, with fewer drive cables 46 and cable routers 50.

The drawing in FIG. 12 shows an embodiment of this invention installed in a rectangular tank subdivided by a single baffle wall 124 into two smaller adjacent rectangular zones 22-A and 22-B. According to the principles of this invention, the end-effector 36 can be positioned accurately and precisely in either zone. When the end-effector 36 is in Zone 22-A, as shown, the four drive cables 46 in Zone 22-A are active and the remaining two drive cables 46 associated exclusively with Zone 22-B 42 are inactive. Inactive drive cables 46 are reeled in and out, as needed, but remain slack. Inactive drive cables 46, therefore, can pass over baffle walls 124 and drop down into other zones, without interfering with the positioning of the end-effector 36 by the active drive cables 46.

In this example, the windlasses 48 are shown in the exemplary configuration integrated with the cable routers 50 into common housings. The main controller 118, computer 116, and SCADA system are not shown in FIG. 12 for clarity. Naturally, control in a multi-zone system 20 would require appropriate switching of active and inactive drive cables 46, depending on the current position of the end-effector 36. A friction guard 126 may be installed on top of the baffle wall 124 to reduce wear of the inactive (slung over) drive cables 46 and avoid snagging. When moving between zones, the main controller 118 (not shown) would direct the movement of the carrier 32 up and over the baffle wall 124 and switch control to the drive cables 46 associated with the new zone while slacking in the drive cables 46 now inactive. Depending on the width of the barrier separating two adjacent zones, the cable routers 50 located along the common barrier may be mounted for sliding or swinging movement to from one side of the barrier to the other so that the effective operating volumes 22 in each zone are sufficiently free of obstacles.

The teachings of this invention enable many benefits and advantages, which include a method for selecting appropriate angle data for position estimation to improve accuracy and precision. These concepts enable use of a constrained trial and error solution for position estimation that facilitates rapid solution using a microprocessor with minimal processing power. Further, this method provides iterative position feedback and fine-tuning to meet operator specified accuracy. This invention represents an improved system 20 that affords position feedback. The apparatus and the method deliberately slacken one or more drive cables 46 for improved accuracy and precision of position estimation. Whereas prior art 3-D cable robot systems appear to be lacking features to facilitate automatic calibration, not so with the present invention. Prior art systems require operator involvement for initial calibration, as well as periodic recalibration. Similarly, prior art systems are not able to detect when recalibration is required, except in extreme cases (i.e., sensors indicate significant problems). However, the present apparatus and method is capable of auto-calibration. The described method includes sequencing of the end-effector movement to use the various sensors to calibrate angle encoders 110, 112 and cable length encoders 72 to improve accuracy and precision and reduce the operator attention required for unattended operation. The apparatus may be combined with a high-tension sensor 68 and low-tension sensor 70 to complement the cable length encoder 72 and thereby reduce the required number of pulleys and the associated system friction, thereby improving accuracy and precision.

A multi-cable system is easiest to install and operate in a 3-D operating volume 22 with no obstructions. However, many environmental process tanks include obstructions, such as baffle walls 124, walkways over the tank, etc. In the case of baffle walls 124 or walkways, both can interfere with drive cables 46 and alter the effective cable lengths and measured angles, which alterations can invalidate position estimation. The system 20 of this invention can operate in a tank with baffle obstructions without compromising stability, accuracy or precision of end-effector 36 positioning. In some embodiments, the apparatus and method enable the sharing of winch assemblies 44 between adjacent operating volumes 22. In those cases, the shared winch assemblies are mounted on moveable supports so that they are able to move between fixed positions (i.e., via rails, hinges, or other means) to facilitate control of the end-effector on either side of an obstruction. This feature reduces the number of drive cables 46 required to operate in a tank with obstructions. Conveniently, the method for dynamically calculating the draw point A coordinates is easily adapted to account for movement of shared winch assemblies 44.

Furthermore, the present invention includes provisions for protection of motor assemblies and pulley assemblies from the elements (i.e., wind, ice, etc.). Unprotected, environmental effects can reduce accuracy and precision, especially during unattended operation. This is especially important for use in high-moisture areas (such as aerobic biological treatment processes), where moisture carried by the drive cables 46 or driven off the process tank can freeze on pulley assemblies and other equipment, reducing accuracy and precision and causing maintenance problems. The various enclosures 60, 84, 98 provide protection against the elements while allowing the necessary movements of the drive cables 46.

The foregoing invention has been described in accordance with the relevant legal standards, thus the description is exemplary rather than limiting in nature. Variations and modifications to the disclosed embodiment may become apparent to those skilled in the art and fall within the scope of the invention. For one example, the teachings of the present invention can be used in filtration applications for testing filter backwash effectiveness. The operating volume 22 envelops some or all of the filter bed. In normal filtration mode the filter bed is too dense and behaves more like a solid than a fluid. During these times in the operational cycle, the carrier 32 would be parked above the filter bed or stuck within it. In backwash mode, when the filter bed is fluidized (acting as a suspension), the carrier 32 could be moved throughout the operating volume 22 to monitor and/or treat the surrounding matter as desired. These and many other applications are made possible through the teachings of this invention.

What is claimed is:

1. A cable-driven three-dimensional crane system for accurately positioning an autonomous carrier within an operating volume defined between a plurality of dynamically shifting draw points, said system comprising:
    a carrier configured to autonomously move an end-effector device within the operating volume,
    a plurality of winch assemblies spaced apart from one another and each associated with a respective one of the draw points, each said winch assembly comprising a windlass and a drive cable and a cable router,
    said windlass including a spool and a reversible motor operatively connected thereto to turn said spool in either a clockwise or counterclockwise direction,
    said drive cable having a proximal end and a distal end, said proximal end operatively wound around said spool of the associated said windlass, said distal end directly connected to said carrier,
    said cable router operatively disposed along the associated said drive cable between said windlass and said carrier, said cable router configured to constrain a running portion of the associated said drive cable as it transits the associated draw point with smooth changes in the direction of and the transmission of force through said drive cable due to positional changes of said carrier within the operating volume,
    each said winch assembly including a cable length encoder operatively engaging the associated said drive cable for assessing changes in the effective length of said drive cable, and each said winch assembly including a draw point angle tracker operatively disposed with respect to said cable router to assess the instantaneous lateral and vertical angles of said drive cable vectoring from its draw point toward said carrier,
    said cable router including a lower pulley supported for rotation within a lower bracket arm, said lower bracket arm being supported for arcuate motion about a swing axis, and
    said lower pulley is disposed within a lower pulley enclosure, a lower port disposed in said lower pulley enclosure through which said drive cable transits.

2. The system of claim 1 wherein, said draw point angle tracker includes a lateral angle encoder and a vertical angle encoder.

3. The system of claim 2 wherein, said vertical angle encoder is disposed within said lower pulley enclosure.

4. The system of claim 2 wherein, said vertical angle encoder includes a tether configured to transmit at least one of electrical signal and electrical power.

5. The system of claim 1 wherein, said lower port comprises a brush having opposing bristles.

6. The system of claim 1 wherein, said cable router includes an upper pulley supported for rotation within an upper bracket arm.

7. The system of claim 6 wherein, a transiting section of said drive cable is continuously located in-between said upper and lower pulleys co-linear with said swing axis.

8. The system of claim 6 wherein, said upper pulley is disposed within an upper pulley enclosure, an upper port disposed in said upper pulley enclosure through which said drive cable transits.

9. The system of claim 8 wherein, said upper port comprises a brush having opposing bristles.

10. The system of claim 8 further including a pulley enclosure thermostat disposed within one of said upper and lower pulley enclosures, and a pulley enclosure heater disposed within one of said upper and lower pulley enclosures and operatively connected to said pulley enclosure thermostat.

11. The system of claim 1 wherein, said carrier has a universal mounting platform configured to attach an end-effector device, said universal mounting platform having a geometric center, a ring encircling said universal mounting platform, said ring being generally circular and centered about said geometric center of said universal mounting platform.

12. The system of claim 11 wherein, said distal end of said drive cable is fitted with a slip ring operatively disposed about said ring of said carrier.

13. The system of claim 11 wherein, said carrier includes a stabilizer weight suspended below said universal mounting platform and vertically centered with respect to said geometric center of said universal mounting platform.

14. The system of claim 1 wherein, said windlass includes a motor enclosure sheltering said spool and said motor, a motor wiper port disposed in said motor enclosure through which said drive cable transits.

15. A cable-driven three-dimensional crane system for accurately positioning an autonomous carrier within an operating volume defined between a plurality of dynamically shifting draw points, said system comprising:
a carrier configured to autonomously move an end-effector device within the operating volume,
a plurality of winch assemblies spaced apart from one another and each associated with a respective one of the draw points, each said winch assembly comprising a windlass and a drive cable and a cable router,
said windlass including a spool and a reversible motor operatively connected thereto to turn said spool in either a clockwise or counterclockwise direction,
said drive cable having a proximal end and a distal end, said proximal end operatively wound around said spool of the associated said windlass, said distal end directly connected to said carrier,
said cable router operatively disposed along the associated said drive cable between said windlass and said carrier, said cable router configured to constrain a running portion of the associated said drive cable as it transits the associated draw point with smooth changes in the direction of and the transmission of force through said drive cable due to positional changes of said carrier within the operating volume,
each said winch assembly including a cable length encoder operatively engaging the associated said drive cable for assessing changes in the effective length of said drive cable, and each said winch assembly including a draw point angle tracker operatively disposed with respect to said cable router to assess the instantaneous lateral and vertical angles of said drive cable vectoring from its draw point toward said carrier
said windlass includes a motor enclosure sheltering said spool and said motor, a motor wiper port disposed in said motor enclosure through which said drive cable transits, and
wherein, said motor wiper port comprises a brush having opposing bristles.

16. The system of claim 15 wherein, said carrier has a universal mounting platform configured to attach an end-effector device, said universal mounting platform having a geometric center, a ring encircling said universal mounting platform, said ring being generally circular and centered about said geometric center of said universal mounting platform.

17. A cable-driven three-dimensional crane system for accurately positioning an autonomous carrier within an operating volume defined between a plurality of dynamically shifting draw points, said system comprising:
a carrier configured to autonomously move an end-effector device within the operating volume,
a plurality of winch assemblies spaced apart from one another and each associated with a respective one of the draw points, each said winch assembly comprising a windlass and a drive cable and a cable router,
said windlass including a spool and a reversible motor operatively connected thereto to turn said spool in either a clockwise or counterclockwise direction,
said drive cable having a proximal end and a distal end, said proximal end operatively wound around said spool of the associated said windlass, said distal end directly connected to said carrier,
said cable router operatively disposed along the associated said drive cable between said windlass and said carrier, said cable router configured to constrain a running portion of the associated said drive cable as it transits the associated draw point with smooth changes in the direction of and the transmission of force through said drive cable due to positional changes of said carrier within the operating volume,
each said winch assembly including a cable length encoder operatively engaging the associated said drive cable for assessing changes in the effective length of said drive cable, and each said winch assembly including a draw point angle tracker operatively disposed with respect to said cable router to assess the instantaneous lateral and vertical angles of said drive cable vectoring from its draw point toward said carrier
said windlass includes a motor enclosure sheltering said spool and said motor, a motor wiper port disposed in said motor enclosure through which said drive cable transits, and
further including a motor enclosure thermostat disposed within said enclosure, and a motor enclosure heater disposed within said motor enclosure and operatively connected to said motor enclosure thermostat.

18. The system of claim 17 wherein, said carrier has a universal mounting platform configured to attach an end-effector device, said universal mounting platform having a geometric center, a ring encircling said universal mounting platform, said ring being generally circular and centered about said geometric center of said universal mounting platform.

19. A cable-driven three-dimensional crane system for accurately positioning an autonomous carrier within an operating volume defined between at least three dynamically shifting draw points, said system comprising:
a carrier configured to autonomously move an end-effector device within the operating volume,
at least three winch assemblies spaced apart from one another and each associated with a respective one of the draw points, each said winch assembly comprising a windlass and a drive cable and a cable router,
said windlass including a spool and a reversible motor operatively connected thereto to turn said spool in either a clockwise or counterclockwise direction, said windlass including a motor enclosure sheltering said spool and said motor, a motor wiper port disposed in said motor enclosure through which said drive cable transits, said drive cable having a proximal end and a distal end, said proximal end operatively wound around said spool of the associated said windlass, said distal end directly connected to said carrier, said cable router operatively disposed along the associated said drive cable between said windlass and said carrier, said cable router configured to constrain a running portion of the associated said drive cable as it transits the associated draw point with smooth changes in the direction of and the transmission of force through said drive cable due to positional changes of said carrier within the operating volume, said cable router including a lower pulley supported for rotation within a lower bracket arm, said lower bracket arm being supported for arcuate motion about a swing axis, said lower pulley disposed within a lower pulley enclosure, a lower port disposed in said lower pulley enclosure through which said drive cable transits, each said winch assembly including a cable length encoder operatively engaging the associated said drive cable, at least one of a high tension sensor and a low-tension sensor operatively engaging said drive cable, and each said winch assembly including a draw point angle tracker operatively disposed with respect to said cable router to assess the instantaneous lateral and vertical angles of said drive cable vectoring from its draw point toward said carrier, said draw point angle tracker includes a lateral angle encoder and a vertical angle encoder.

20. The system of claim 19 wherein, said carrier has a universal mounting platform configured to attach an end-effector device, said universal mounting platform having a geometric center, a ring encircling said universal mounting platform, said ring being generally circular and centered about said geometric center of said universal mounting platform, said distal end of said drive cable fitted with a slip ring operatively disposed about said ring of said carrier.

* * * * *